United States Patent
Fix

(10) Patent No.: US 11,422,229 B2
(45) Date of Patent: Aug. 23, 2022

(54) DISPLAY AND ALARM FOR VEHICLE OBJECT DETECTION RADAR

(71) Applicant: PRECO ELECTRONICS, LLC, Boise, ID (US)

(72) Inventor: Jonathan Edward Fix, Boise, ID (US)

(73) Assignee: Preco Electronics, LLC, Boise, ID (US)

( * ) Notice: Subject to any disclaimer, the term of this patent is extended or adjusted under 35 U.S.C. 154(b) by 140 days.

(21) Appl. No.: 16/780,714

(22) Filed: Feb. 3, 2020

(65) Prior Publication Data
US 2020/0284872 A1  Sep. 10, 2020

Related U.S. Application Data

(60) Provisional application No. 62/800,330, filed on Feb. 1, 2019.

(51) Int. Cl.
| | |
|---|---|
| *G01S 7/10* | (2006.01) |
| *B60Q 9/00* | (2006.01) |
| *G01S 7/06* | (2006.01) |
| *G01S 13/88* | (2006.01) |
| *G01S 13/931* | (2020.01) |
| *G08G 1/16* | (2006.01) |

(52) U.S. Cl.
CPC .............. *G01S 7/10* (2013.01); *B60Q 9/008* (2013.01); *G01S 7/062* (2013.01); *G01S 13/886* (2013.01); *G01S 13/931* (2013.01); *G08G 1/166* (2013.01)

(58) Field of Classification Search
CPC . G01S 7/04; G01S 7/10; G01S 13/931; G01S 13/886; G01S 3/783; G01S 3/784; G01S 7/4806; G01S 7/022
USPC .............. 340/425.5; 342/10, 70; 701/301
See application file for complete search history.

(56) References Cited

U.S. PATENT DOCUMENTS

| | | | | |
|---|---|---|---|---|
| 5,339,075 A * | 8/1994 | Abst | ................ | G01S 15/931 340/904 |
| 6,072,391 A * | 6/2000 | Suzuki | ................ | B60Q 1/2665 340/815.45 |
| 7,609,152 B2 * | 10/2009 | Crowe | ................ | B60Q 9/00 340/439 |
| 8,340,894 B2 * | 12/2012 | Yester | ................ | G08G 1/096791 701/301 |

(Continued)

FOREIGN PATENT DOCUMENTS

| | | |
|---|---|---|
| DE | 102008019461 A1 | 10/2009 |
| WO | 2012/172067 A1 | 12/2012 |
| WO | 2020/160549 A1 | 8/2020 |

OTHER PUBLICATIONS

PTC International Search Report and the Written Opinion, for PCT/US2020/016425, Applicant: Preco Electronics, LLC, dated Mar. 30, 2020.

*Primary Examiner* — Erin F Heard
*Assistant Examiner* — Michael W Justice
(74) *Attorney, Agent, or Firm* — Lee & Hayes, P.C.

(57) ABSTRACT

The present disclosed technology is a generally two-dimensional display and audible alarm to show notification and urgency information from multiple object detection radar sensors on a vehicle. When a particular sensor is reporting to the vehicle's operation and control center, the corresponding light(s) according to a top view of the vehicle in the array may light up, pulse or flash accordingly. In addition, an audible alarm may operate in concert and emphasis with the light(s) display.

34 Claims, 24 Drawing Sheets

(56) References Cited

U.S. PATENT DOCUMENTS

| | | | |
|---|---|---|---|
| 8,903,639 B2* | 12/2014 | Yester | G08G 1/096741 |
| | | | 701/301 |
| 9,110,149 B2* | 8/2015 | Valentine | G01S 7/04 |
| 9,376,121 B2 | 6/2016 | Simon | |
| 10,261,171 B2* | 4/2019 | Valentine | G01S 7/4806 |
| 10,723,347 B2* | 7/2020 | Minemura | B60T 7/22 |
| 2009/0051521 A1* | 2/2009 | Crowe | B60Q 9/00 |
| | | | 340/461 |
| 2010/0191467 A1* | 7/2010 | Wise | G08G 5/04 |
| | | | 701/301 |
| 2011/0087433 A1* | 4/2011 | Yester | G08G 1/166 |
| | | | 701/469 |
| 2014/0043182 A1* | 2/2014 | Valentine | G01S 7/022 |
| | | | 342/20 |
| 2016/0154090 A1* | 6/2016 | Valentine | G01S 7/022 |
| | | | 342/20 |
| 2016/0236616 A1* | 8/2016 | Kurihara | G01S 7/40 |
| 2018/0086346 A1* | 3/2018 | Fujisawa | B60W 40/08 |
| 2018/0162389 A1* | 6/2018 | Minemura | B60T 7/12 |
| 2019/0253670 A1* | 8/2019 | Chien | H04N 5/2256 |

\* cited by examiner

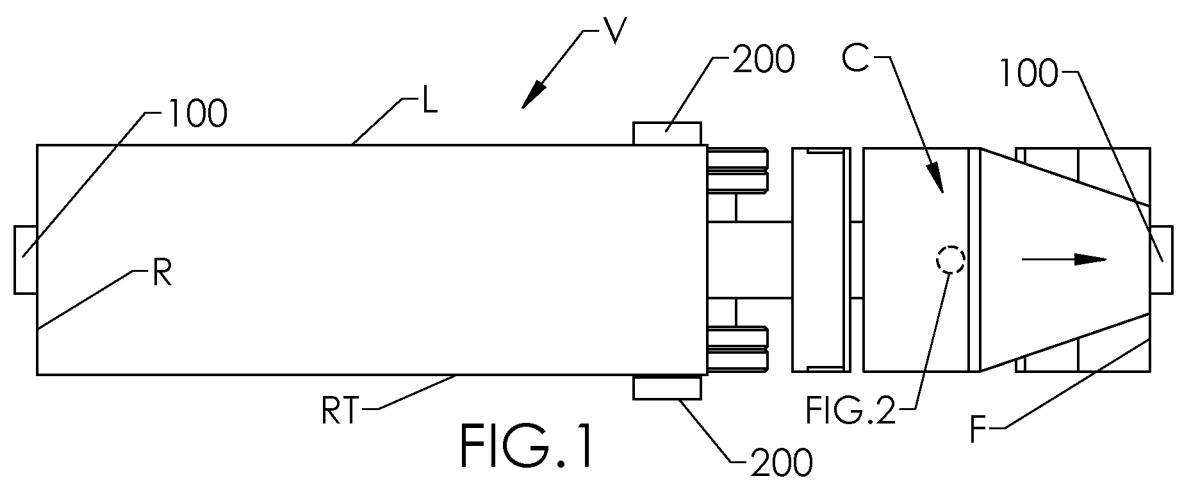
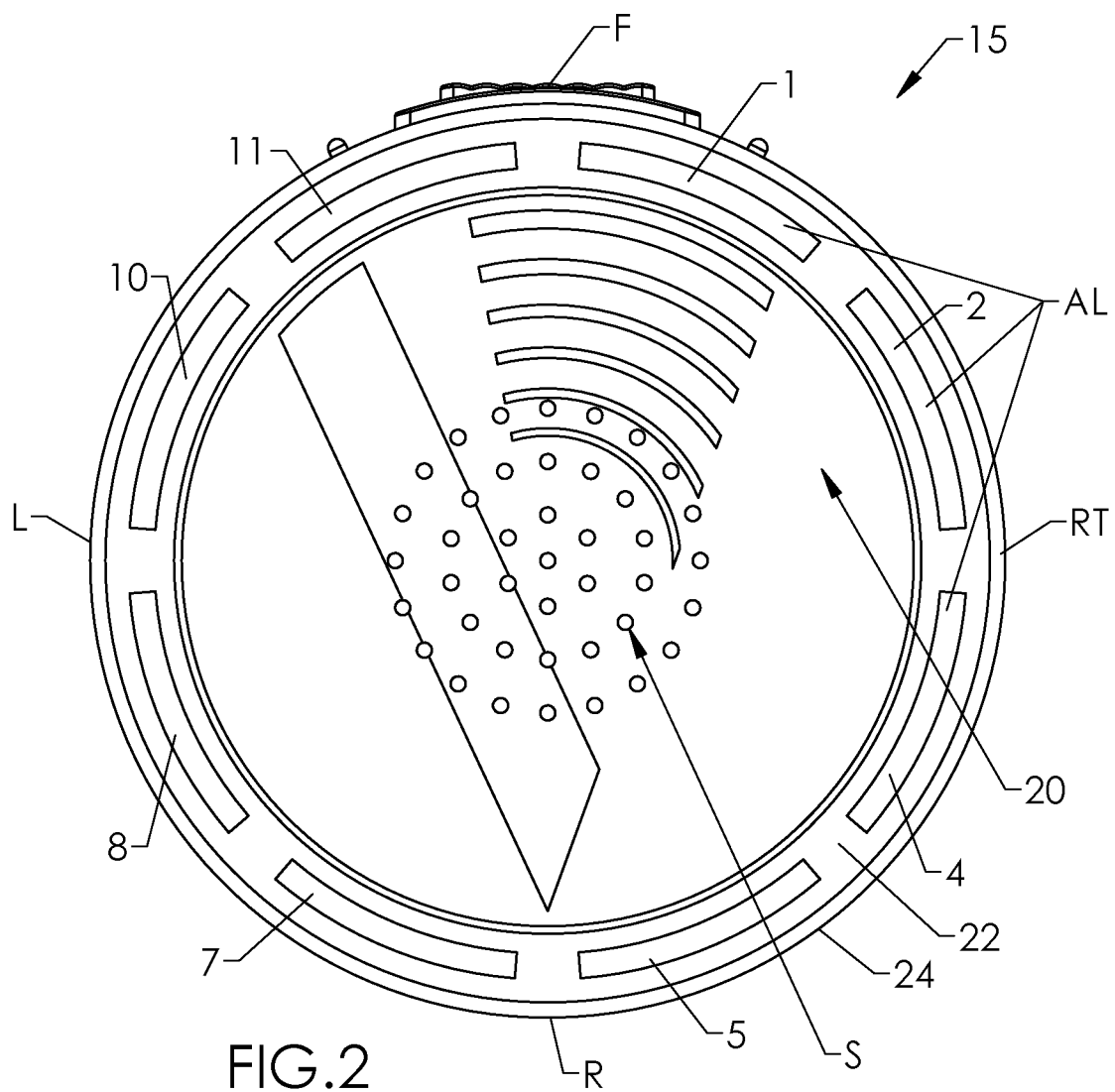

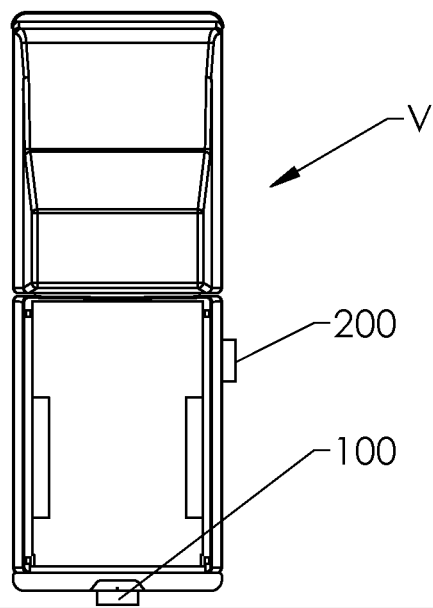
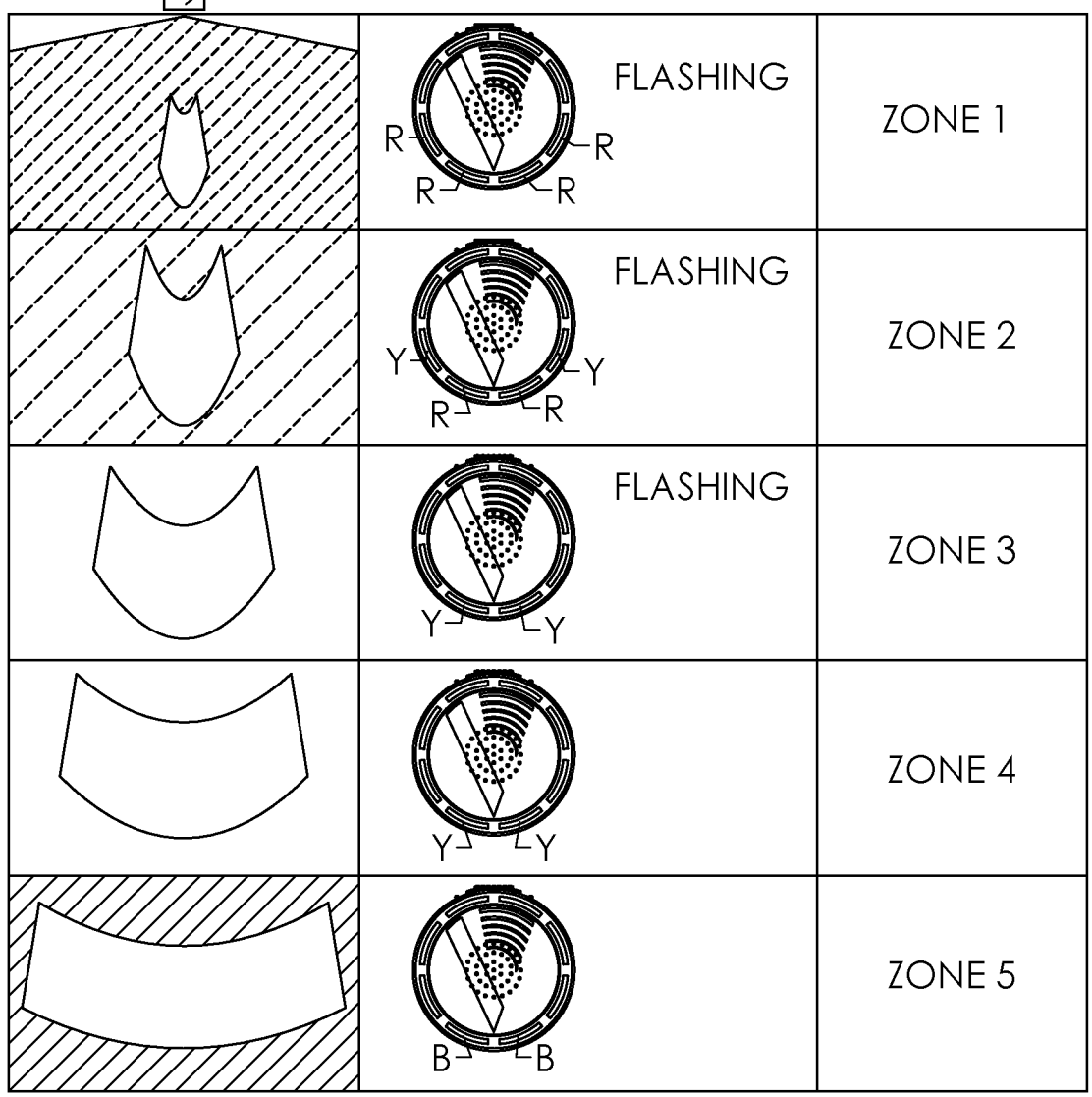
FIG.8

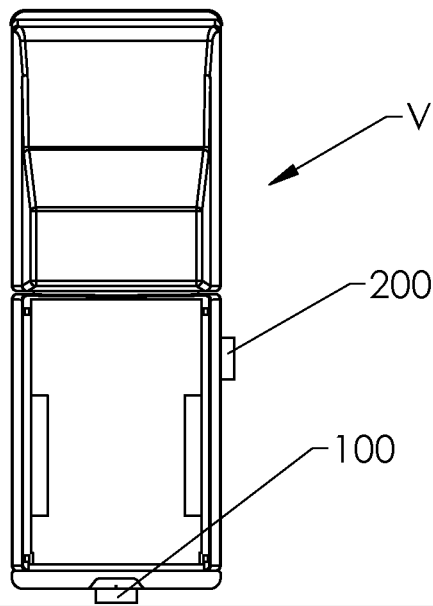
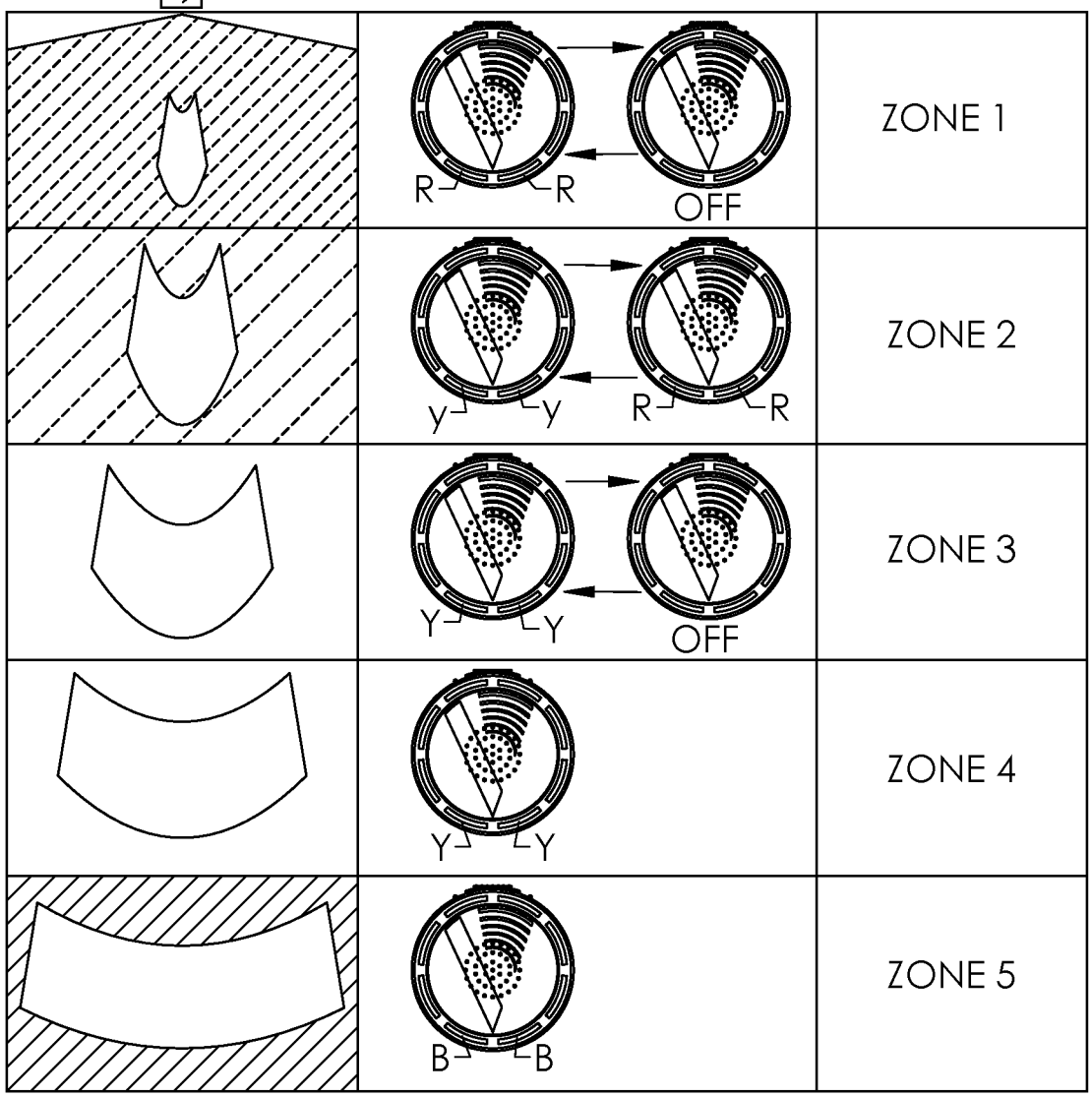
FIG.15

DISPLAY AND ALARM FOR VEHICLE OBJECT DETECTION RADAR

This Application claims priority from U.S. Provisional Patent Application No. 62/800,330, filed Feb. 1, 2019 and entitled "Screen Display for Vehicle Object Detection Radar", which prior application is hereby incorporated herein by reference.

BACKGROUND OF THE DISCLOSED TECHNOLOGY

Field of the Disclosed Technology

This invention relates generally to vehicle object detection systems. More specifically, this invention relates to apparatus, systems and methods for a display and alarm for operators of vehicle object detection radar systems.

Related Art

Vehicle display and alarm designers have worked to provide easily readable and understandable displays, and related audible alarms. As a result there are many such displays and alarms available.

However, the inventors of the present application are not aware of any specific other display and audible alarm with all the features of the subject disclosed technology. The subject inventors observed the problem of the need for a compact, convenient display and operatively connected audible alarm which not only indicates the presence of an object of interest within the vehicle object detection radar's range, but also the direction and distance, relative to the vehicle and vehicle operator, of the location and motion, if any, of the object of interest. Additionally, the inventors observed the problem of the need for the display and audible alarm to also indicate by brightness, volume and/or intensity, of flashing and/or beeping, for example, of the relative proximity, or distance, and relative travel, if any, of the detected object from the sensing vehicle. The disclosed technology addresses these observed problems and needs.

German published Application 10 2008 019 461 41 (Oct. 22, 2009) of Daimler AG discloses a vehicle display unit wherein detected information may be displayed with the aid of spatially coded display elements surrounding a schematic vehicle top view. The display elements may be highlight in color, and indicated generally the direction in which the detected information relates.

U.S. Pat. No. 9,376,121 B2 (Jun. 28, 2016) of Robert Bosch, GMBH discloses a driving display unit for indicating eh vehicle's current driving environment and for suggesting a related safe driving environment.

SUMMARY OF THE DISCLOSED TECHNOLOGY

The present disclosed technology comprises in one exemplary embodiment a generally two-dimensional display to show notification from simultaneous inputs from multiple radar sensors on several sides of a vehicle. Preferably, an audio speaker is operatively connected to the display to provide also audible alarm information. In another exemplary embodiment, input may be from a single radar sensor.

The present display contains and involves an array of a multiple number of lights, preferably light-emitting diodes (LEDs). Preferably, the lights are arranged in a circular or oval or rectangular manner, including front, back, left side and right side typically, corresponding to the general shape in a top view of the vehicle being monitored.

Optionally, partitioning lines that demarcate lights or sectors of lights may be displayed and/or a cross-hairs-type symbol may also be displayed near the center of the lights array. Also, optionally, a schematic depiction of the top view or top outline of the vehicle being monitored is displayed within or around the light array, with the lights on or near the depiction of the vehicle, so that one or more of the lights correspond generally to the location on the vehicle of each relevant radar sensor. Or, the lights on or near the depiction of the vehicle may correspond generally to the location on the vehicle currently more under threat of impact or collision. Or, the lights on or near the depiction of the vehicle may correspond generally to the direction and distance of a detected object relative to the sensing vehicle.

This way, when a particular sensor is reporting to the vehicle's operation and control center, the corresponding light or lights in the array light(s) up or, pulses or flashes accordingly. In addition, the light color, intensity or brightness, and on-off, pulse, or flash frequency may vary according to the urgency of the information being provided by the relevant sensor. Also, other corresponding notifications and alarms regarding the same sensor information may be made, both local and remote, including audible beepers, buzzers and horns, for example.

BRIEF DESCRIPTION OF THE DRAWINGS

The terms "top", "top surface", and "top view", instead of "front", "front surface" and "front view", are used herein for the display surface/face of the display unit, even though, in the display unit's installed, in-use orientation, that display surface/face will typically face generally toward the operator rather than upward. This "top" terminology is used to differentiate the display surface/face from the front side F of the display unit and its display, which is intended to visually and instinctively correspond, in the operator's eyes and mind, to alerts at the front F of the vehicle. Also, as marked in FIGS. 2-4 and other of the drawings, the rear side R of the display unit and its display surface/face corresponds to alerts at the rear R of the vehicle, and the right RT and left L sides of the display unit and its display surface/face correspond to alerts at the right RT and left L sides of the vehicle, respectively.

FIG. 1 is a top view of an exemplary vehicle including an embodiment of a display unit according to the invention, indicated to be in the vehicle cab by the dashed circle.

FIG. 2 is a top view of an embodiment of the display unit such as installed in the vehicle of FIG. 1.

FIG. 8 is an illustration of a top view of an alternative exemplary vehicle, which has a rear object detection sensor, wherein various display patterns on the display surface of the display unit of FIG. 2 are shown according to the distance zone of object detection behind the vehicle.

FIGS. 15 and 15A, together, illustrate a combination system wherein a vehicle has a rear sensor and a right side sensor, and illustrate display patterns on the display surface of the unit of FIG. 2 for simultaneous detection in various distance zones of objects to the rear and right of the vehicle, wherein FIG. 15 shows the display patterns on the rear quarter of the display screen and FIG. 15A shows the display patterns on the right quarter of the same display.

FIG. 16 illustrates the display pattern when the four sensors detect objects in zone 1 of each of the front, rear, right and left sides of the vehicle. FIG. 17 illustrates the display pattern when the four sensors detect objects in zone 2 of each of the front, rear, right and left sides of the vehicle. FIG. 18 illustrates the display pattern when the four sensors detect objects in zone 3 or 4 of each of the front, rear, right and left sides of the vehicle. FIG. 19 illustrates the display pattern when the four sensors detect objects in zone 5 of each of the front, rear, right and left sides of the vehicle.

DETAILED DESCRIPTION OF CERTAIN EMBODIMENTS

Figure 3:
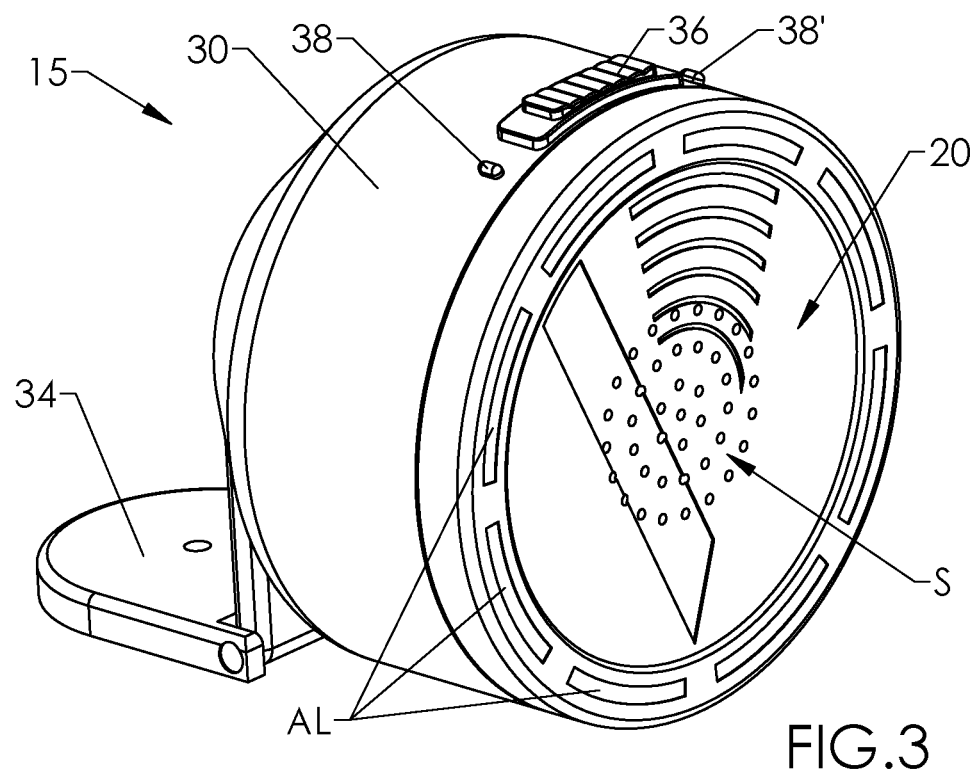
FIG. 3 is a left side perspective view of the embodiment of FIG. 2.

General Discussion:

The invention relates to a display unit 15 having a display 20 (or "display surface" or "display face") for viewing by a driver or other operator of vehicle/equipment that has an object detection system that monitors part or all of the vehicle's surroundings. Preferably, the display unit is incorporated into, and operatively connected to other components of, a radar-based object detection system. The single display unit 15 may be described as having a display 20 comprising multiple lighted areas, wherein the display 20 is partitionable during operation into sectors each comprising at least one lighted area. While "sector" is the terminology used herein, ("section of lights", "segment of lights" or "portion of lights" may be substituted for "sector" in certain embodiments. The lighted areas and the sectors of lighted areas may be independently and separately controlled, so that the divided display 20 may emit alerts of objects being sensed at different locations/direction relative to the vehicle, that is, "direction-specific" or "vehicle-side-specific" alerts 360 degrees around the vehicle. For example, when sensors are provided on multiple sides of the vehicles, for example, front and rear, or right and left, the display may be divided into two sectors, that is, a front half circle and a rear half circle, or a right half circle and a left half circle. In other words, this allows a full 180 degrees of the display for each of the front and rear sensors and their associated alerts, or a full 180 degrees of the display for each of the right and left sensors and their associated alerts. When sensors are located on three or four sides of the vehicle, the display will typically be divided into four sectors each of 90 degrees, rather than two 180 degrees sectors. This may reduce the number of lighted areas, and the size of the lit area, to alert for each side of the vehicle, but graduating/escalating colors and sounds for indicating the closeness of the detected objects and/or for situations of particular concern, will still alert the operator effectively, as described later in this document. See FIGS. 1-20.

Preferably, the multiple lighted areas are spaced circumferentially around the center of the display 20 to create an "array of lights" AL, and said array of lights AL is divided up into sectors of the display comprising one or more lighted areas in each sector of the display 20. The array of lights AL may comprise: at least one front lighted area for corresponding to a direction/zone(s) in front of the vehicle; at least one rear lighted area for corresponding to a direction/zone(s) behind (to the rear of) of the vehicle; at least one right lighted area for corresponding to a direction/zone(s) to the right of the vehicle; and at least one left lighted area for corresponding to a direction/zone(s) to the left of the vehicle. Each lighted area may light up in different colors depending on the type of alert signal that is actuated. For simplicity, hereafter, the term "light" or "lights" are used instead of "lighted area", but it will be understood that each "light" may be a lighted/light-emitting area resulting from a single light, or more preferably from multiple lights such as multiple LEDs that may shine through a lens, according to a desired color that is actuated according to the firmware/software for the desired alert design. In other words, a "light" may comprise multiple LED's to accomplish the various colors desired for the alert light pattern.

Preferably, therefore, each light comprises multiple LEDs behind a lens, and each light/lens may be curved, arched or otherwise spaced along it respective lighted area, so that multiple lights/lenses extend across each of the front width of the display, the rear width of the display, the right width of the display, and the left width of the display. For example, the lights/lens may be arranged in a ring, circle or oval, or even a square in certain embodiments.

In use for alerting the operator to one or more objects around the vehicle, the array of lights AL may be described as being divided or "partitioned" into multiple sectors. For example, in the preferred display 20 comprising eight lights, the display 20 may be partitioned for use into up to eight sectors, but more typically is partitioned into fewer than eight sectors to include more than one light in each sector, for example, at least two lights per sector. In use, the total, 360 degree array of lights AL is partitioned into said sectors by firmware/software to create alert patterns for various object detection circumstances around the vehicle. The array of lights AL is thus partitioned to provide an alert pattern representative of the direction of the detected object(s) and the level of concern/danger associated with the detected object(s). For example, for a low level or cautionary alert in front of the vehicle, the alert pattern may comprise a sector comprising the two front lights (front-right and front-left) being lit in a low-level or even a cautionary color. For example, for a high level alarm, a sector of the two front lights plus the right-front and a left-front lights may also be lit (at the same time or in alternating flashes) in the same or a different color as the two front lights. Therefore, for example, different sectors of a ring/circle/oval arrangement of lights may be used, depending on what side the object is detected, and in some embodiments said different sectors are used in flashing mode and/or in different colors, depending on the level of alert, for example, corresponding to the closeness of the detected object to the vehicle and/or corresponding to situations of particular concern, as further described below.

In addition to the "direction-specific" or "vehicle-side-specific" alerts provided by the 360-degree light display, discussed above, the preferred display 20 preferably also comprises additional lighting features that may be associated with certain of the alert conditions, for example, lights of various colors, lights flashing on and off, and lights flashing between two different colors. The preferred display 20 may also comprise sounds from a speaker connected to, and preferably installed in the display 20, that may be associated with certain of the alert conditions, for example, various frequency, volume, and/or patterns of sound. These additional light and sound features may be called "graduated" or "escalating" alert features that supplement the direction-specific lights to inform the operator of additional seriousness of the situation.

In certain embodiments, the object detection system and its sensors are adapted to determine the distance of the detected object from the vehicle, and to optionally graduate/escalate the display with additional light features of the partitioned display 20 and/or sound features, so that not only the location (front, rear, right, left) of the object is indicated, but also the distance of the object from the vehicle is indicated. In certain embodiments, said distance from the vehicle is described/defined in the form of zones of distance from the vehicle that are within the detecting capability of the sensors. For example, the distance may be determined/categorized as a zone that is closest to the vehicle, a zone farthest from the vehicle, and one or more zones in-between. In current preferred embodiments, five detection zones are defined for each sensor that is used, for example, five zones at one or each of the front and the rear, and five zones at one or each of the right and left. The object detection device/system may be adapted to monitor each set of five zones for which a sensor is installed, to prioritize the detections of each sensor based on closeness of the objects detected, which typically equates to increased danger, and to actuate a display light pattern, and preferably also sounds, accordingly. Thus, the display 20 will show a 360 degree light pattern specific to the prioritized detected objects to indicate the side(s) where objects are detected and also the closeness of the closest object on the side of each sensor. See FIG. 21.

Figure 32:
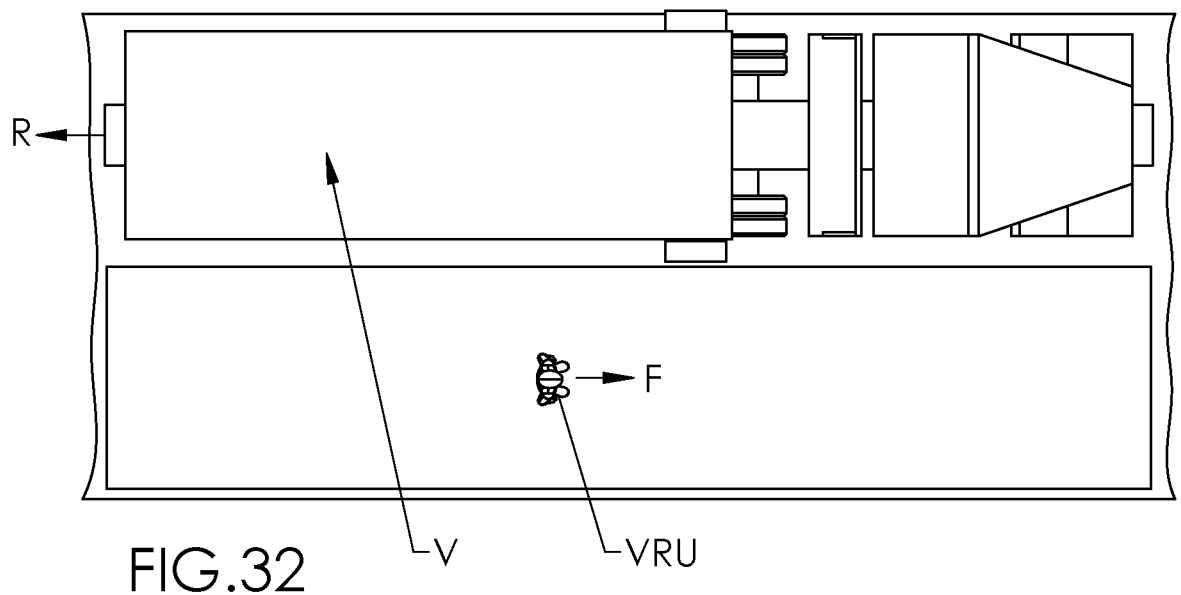
FIG. 32 is a top view of an exemplary vehicle wherein a person (such as a vulnerable road user) is moving/traveling beside and in the opposite direction as the vehicle and the vehicle is backing up.
Figure 33:
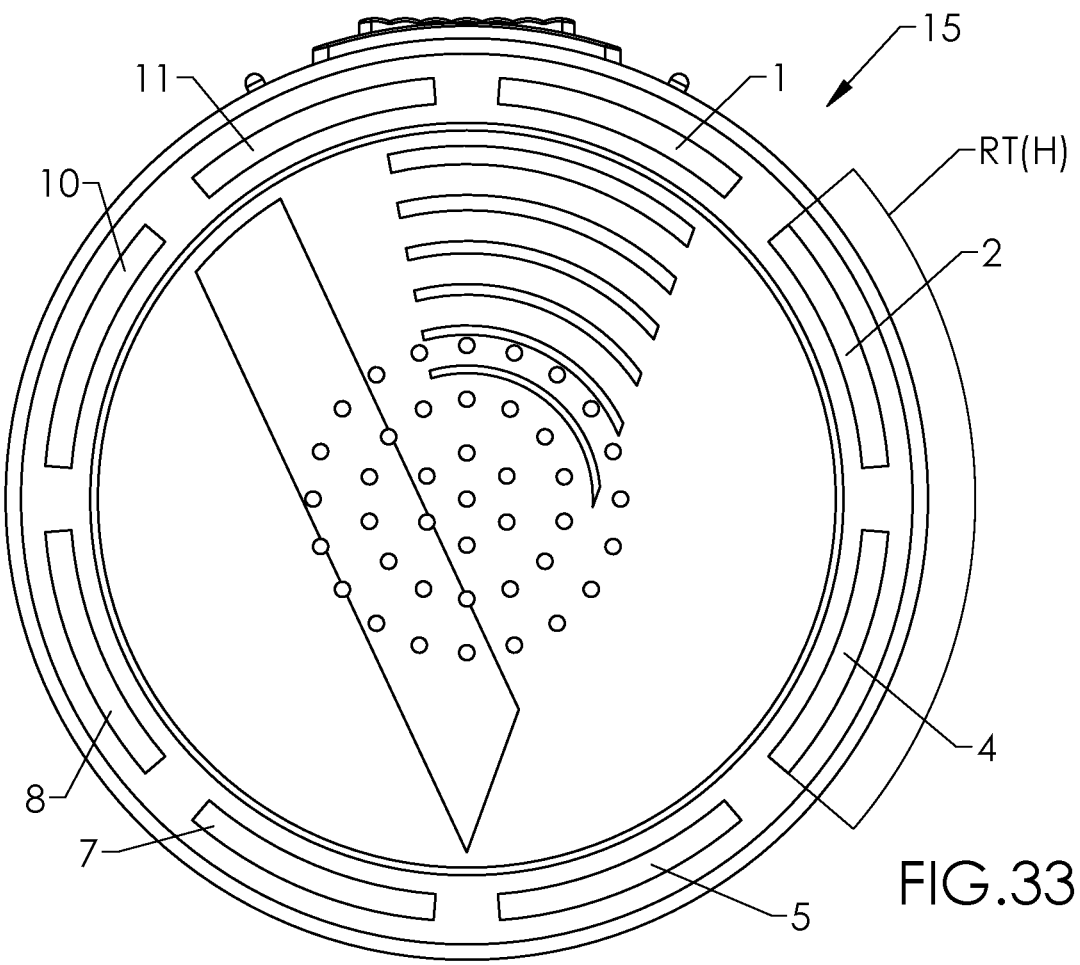
FIG. 33 illustrates the alert pattern on the display surface of the unit of FIG. 2, for the situation in FIG. 32.

In certain embodiments, the object detection system and its sensors are also adapted to determine and notify the operator when particular situation(s) is/are developing that have the potential for additional danger because of a combination of particular vehicle movements in the vicinity of a detected object(s) and/or particular object movements in the vicinity of the vehicle. Such "situation-specific" alerts may include, for example, an object moving in a lane into which the operator is planning to turn (FIGS. 26-31), or an object moving into, or in, a lane parallel to the vehicle, when the vehicle is backing up (FIGS. 32 and 33). The object detection system and its display unit 15 may provide such "situation-specific" alerts, by emitting display sector and color combinations similar to those described above for the "direction-specific" alerts and, optionally, also by emitting graduated/escalated alerts similar to those described above. Because many embodiments of such "situation-specific" alerts are caused by objects being detected at or about the same time that the operator is taking an action to turn, back-up, or make another change in the vehicle's direction or operation, the operator is expected to be particularly aware of the meaning and/or seriousness of the "situation-specific" alerts. See FIGS. 26-33.

FIGS. 34-39 portray an embodiment of the display unit from various sides, including a perspective view, and top, bottom, front, rear, and left side views, wherein a right and a left view of the preferred embodiment are mirror images or each other.

Figure 40:
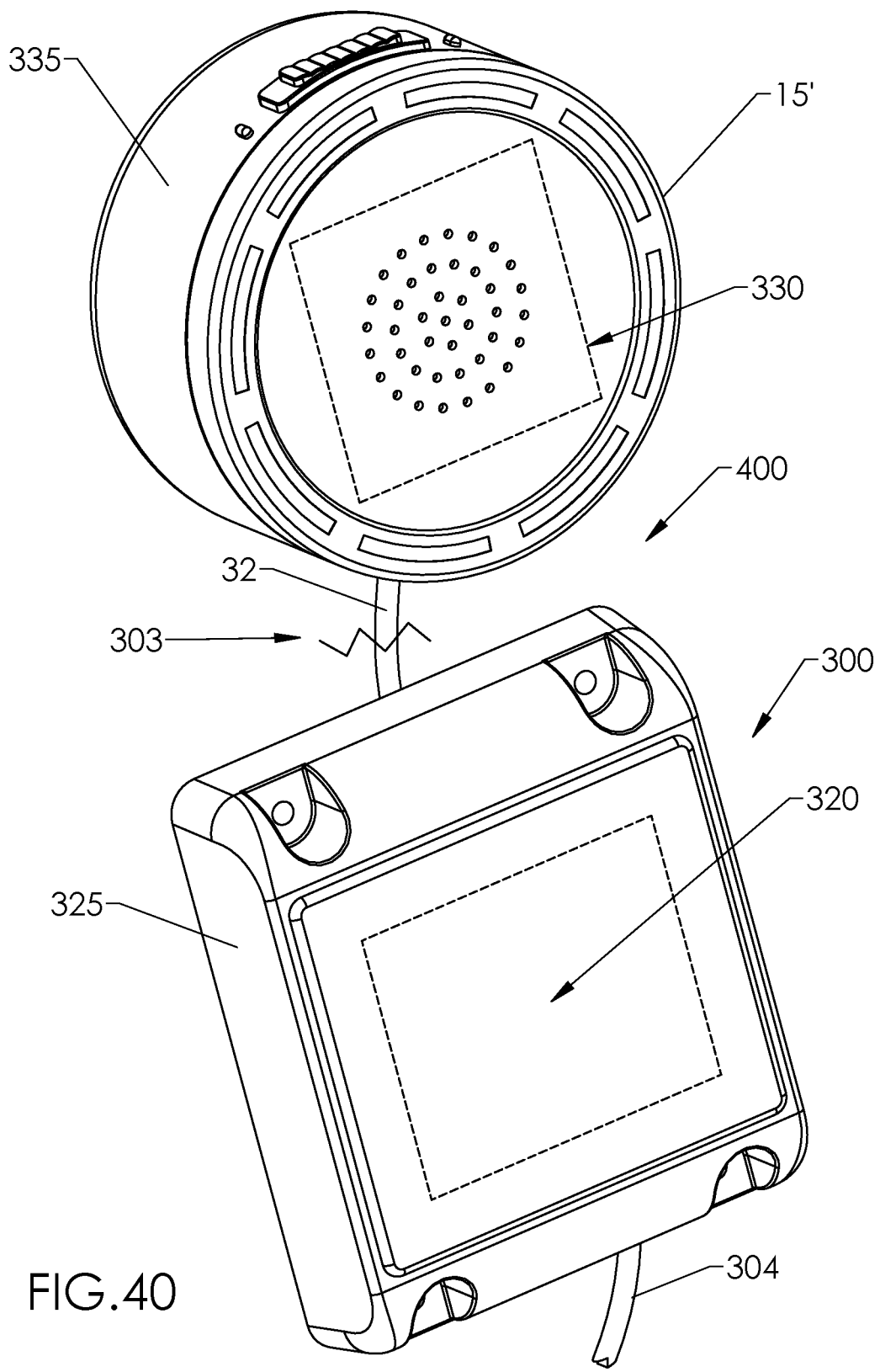
FIG. 40 is a perspective view of one embodiment of an object detection system in which are included the display unit of FIG. 2 (without the V Logo™), a radar-based sensor, an electrical and data connection between the sensor and the display unit, and a power cable that may be connected to the vehicle power source/circuit.

FIG. 40 portrays the display unit of FIGS. 34-39 as a component, and in cooperation with other components, of an exemplary radar-based objection detection system.

Figure 4:
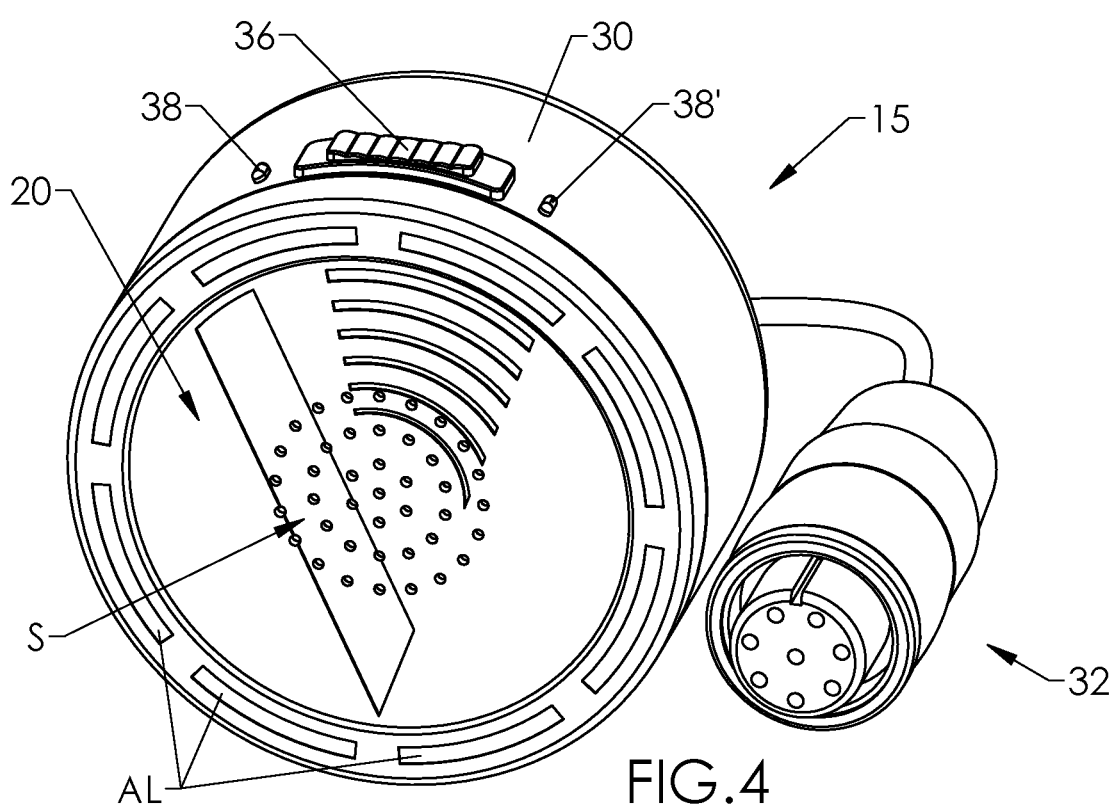
FIG. 4 is a top perspective view of the embodiment of FIG. 2.

Referring Specifically to the Figures:

Referring more specifically to the Figures, there are shown several, but not the only, embodiments of the display unit and/or the display apparatus and/or an object detection system 400 including the display unit and its display surface, and/or embodiments of methods of the operation of the apparatus for notification/alert/alarm patterns in an object detection system of a vehicle/equipment V. An exemplary vehicle V is shown in FIG. 1, wherein the vehicle V includes an embodiment of the display unit 15 mounted in the vehicle cab C. The preferred display unit and its display 20 (also herein and/or in the claims, "display surface" or "display face"), are shown in FIGS. 2-4, wherein 8 independently-controlled lights are provided, for dividing or "partitioning" the display 20 into up to eight sectors that can be used to provide various display patterns. Display unit 15 comprises display 20 (or display surface/face 20); housing 30; cable and connector 32; mount 34; a speaker volume control 36 for adjusting the speaker volume, and/or for an acknowledgement of the audible alarm in order to silence the audible alarm after the operator has heard it; and status LED lights 38, 38' for signaling general operability and readiness of the system for use.

Figure 5:
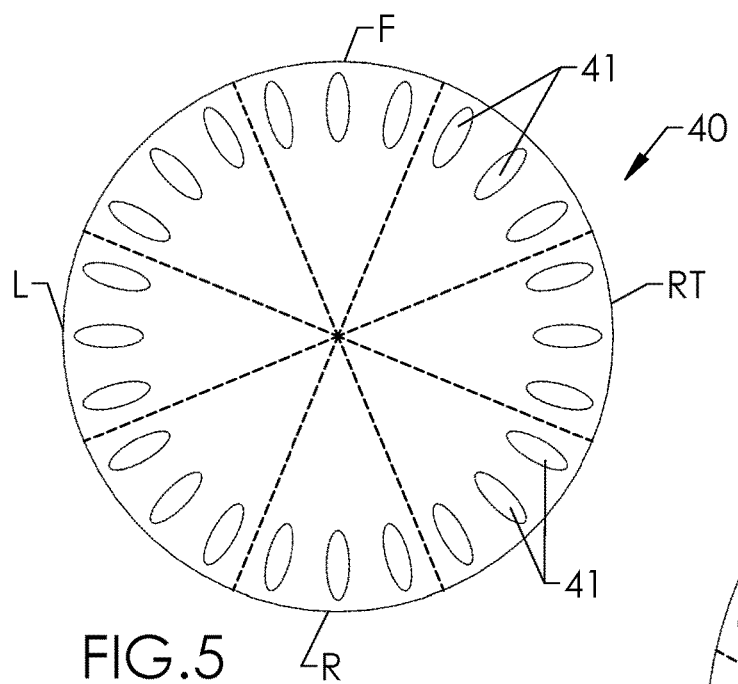
FIG. 5 is a schematic, top view of a display unit according to another embodiment of the invention.
Figure 6:
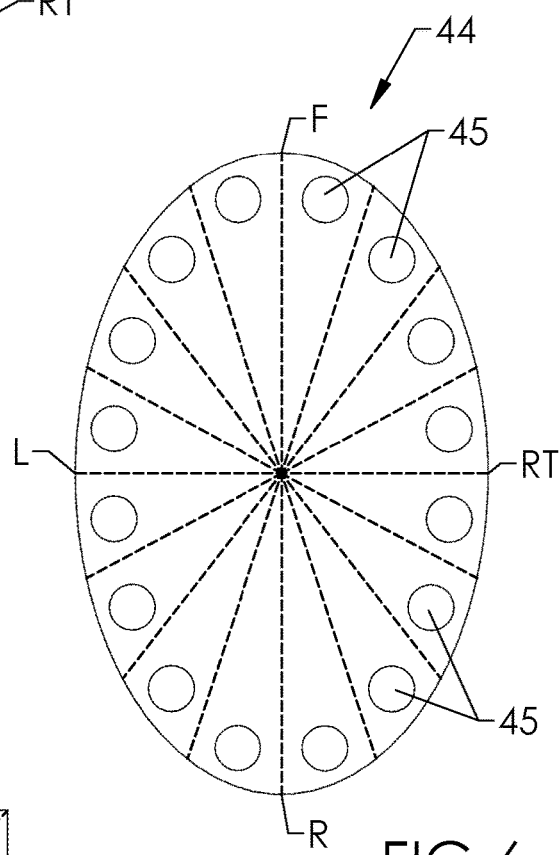
FIG. 6 is a schematic, top view of a display unit according to yet another embodiment of the invention.
Figure 7:
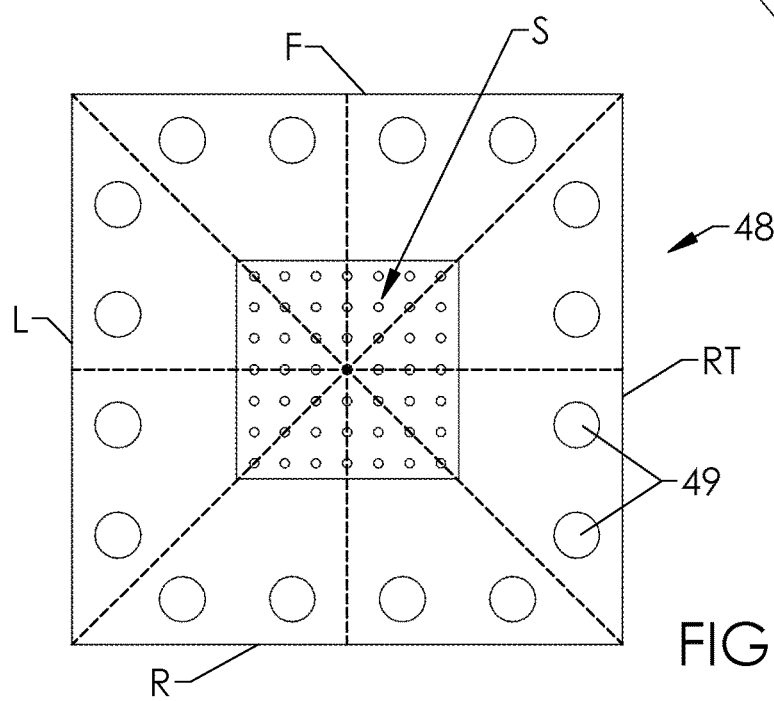
FIG. 7 is a schematic, top view of a display unit according to yet another embodiment of the invention.

Several, but not the only, alternative embodiments of the display are shown in FIGS. 5-7, wherein displays 40, 44, 48 are schematically portrayed as having alternative outer perimeter shapes, and having alternative numbers, shapes, and arrangements of lights. In FIG. 5, display 40 is circular and has a ring of 24 lights 41, that are shown by dashed lines as being partitioned into 8 sectors. An option for use of display 40, in certain embodiments of an object detection system, may include a single sensor actuating a single sector, and therefore the possibility of using as many as 8 sensors each displaying in a 45 degrees sector, for example, a sensor at each of the front, front-right corner, right, right-rear corner, rear, rear-left corner, left, and left-front corner.

In FIG. 6, display 44 is oval and has an oval ring of 16 lights 45 that are shown by dashed lines as being partitioned into 16 sectors. An option for use of display 44 in FIG. 6, in certain embodiments of an object detection system, may include a single sensor actuating a single sector, and therefore the possibility of using as many as sixteen sensors each displaying in a sector of about 22 degrees. A more likely option is to partition the lights into 8 sectors, one for each of 8 sensors, so that each sensor actuates a display in a sector of 45 degrees. Or, another likely option is to partition the lights into 4 sectors, one for each of four sensors, each sensor actuating a display in a sector of 90 degrees.

In FIG. 7, display 48 is square and has a generally square ring of sixteen lights 49 being partitionable into sixteen sectors but shown by the dashed lines as being partitioned into eight sectors. Therefore, one option for use of display 48 in FIG. 7, in certain embodiments of an object detection system, may include eight sectors for eight sensors, as discussed above regarding FIG. 5. Another option is to partition the display 48 into four sectors, for four sensors, as discussed for the preferred round display 20. Display 48 includes a speaker S at its center, while displays 40 and 44 do not, indicating that not all display screen embodiments necessarily require a speaker, or that speakers may be located elsewhere on the display unit in certain embodiments. It will be understood that the holes near the center of displays 20, 48 are outlets for a speaker S contained within the display unit housings, and that other styles and designs of outlets (also output ports) for sound may be used in place of the holes shown in displays 20, 48.

Each of the embodiments of FIGS. 2-7 illustrates how a display may include various numbers, shapes and arrangement of lights, preferably in a ring of lights all around the display, to represent the surroundings of the vehicle on which the display is provided, wherein the lights are partitionable into various sectors to accommodate various numbers of sensors and to provide a visual alert to a vehicle operator that can become, upon a quick glance, an effective and intuitive warning of the location objects in said surroundings, so that the operator can take quick action when necessary. The dashed lines partitioning into sectors of displays 40, 44, 48 illustrates that differently-sized sectors and/or multiple sectors could be used for an alert of an object in different directions from the vehicle. While FIGS. 5-7 utilize dashed lines to illustrate the concept of partitioning, partitioning lines or other indicia may be etched, painted, or otherwise marked on the display 20 to assist the vehicle operator in placing his/her attention relative to the locations of the various sensors, and hence the locations of the detected objects, for easier and quick reading of the display. For example, depending on how many and where sensors are placed on the vehicle, any one or more of the sectors may be used, for example, the lights in a 22 degree sector, a 45 degree sector, a 90 degree sector (quarter), or a 180 degree sector (half), for example.

Use and alert display/patterns of various display units and display surfaces/faces, according to certain embodiments of the invented apparatus and invented methods, will be understood by reference to display unit 15 and display 20, as further described below and portrayed in FIGS. 8-33. Use and alert displays/patterns of display unit 15 may be part of a radar object detection system that comprises: one or more sensor units 100, 200; a display unit 15 operatively connected to the sensor units but located at a distance from each sensor unit and typically in the vehicle cab C; and associated hardware, firmware and/or software, preferably contained within the sensor units 100, 200 to adapt the sensor(s) for proper object detection and signaling to the display unit 15, and within the display unit 15 for notification via visual, and operationally also audio alerts, to the driver/operator of the vehicle V of the detection of objects around the vehicle.

The display unit 15 and its display 20 (or display surface/face) are particularly beneficial to object detection systems that comprise multiple object-detecting sensors on a single, human-driven/operated vehicle. In certain embodiments, the number of sensors may be selected from a range of 1-4, 1-8, 1-12, 1-16, 1-36, 4-8, 4-12, or 4-16, with the display partitioned to allow an alert caused by each sensor to be displayed in at least one sector with at least one light of the display. In many embodiments, the number of sensors will be 1-4 sensors, for example, a sensor on the front and/or a sensor on the rear of the vehicle; a sensor on the right and/or a sensor on the left of the vehicle; or a sensor on the front and/or rear of the vehicle, plus a sensor on the right and/or left of the vehicle. While a single side of the vehicle may be monitored by a single object detection sensor, more typically there is a benefit to monitoring multiple sides of the vehicle by providing multiple object detection sensors that are each on a different side of the vehicle. Thus, the preferred display unit 15 and display 20 are adapted to alert for objects at multiple sides/locations around the vehicle, for example, up to and including four sides/locations.

Therefore, the preferred display may be described as a 360-degree display, as the display is equipped with lights/lit-areas all around, or spaced all around, 360 degrees of the face. Detection signals from a given sensor, corresponding to detection of an object on the corresponding side of the vehicle, will activate one or more lights that are located at or toward the side of the display corresponding to the vehicle side where the object has been detected. By thus indicating on what side of the vehicle is the detected object, the display assists the operator assess the environment of the vehicle he/she is driving/operating, for further monitoring, mirror-checking, and/or corrective or evasive action to avoid impact with the object or other danger to the people and equipment. Indicating on what side of the vehicle the object is particularly important so that the operator can access the danger in view of the direction the vehicle is driving in and/or the operator's plans for speeding up, turning, lane changes, backing up, or other maneuvering.

As shown in FIGS. 2-4, the preferred display unit 15 featuring the 360 degree display 20 comprises a generally cylindrical housing for containing hardware, firmware and/or software, and electrical and data connections 32, which allow the display unit 15 to cooperate with the sensor(s) 100, 200, for handling the sensor(s)' input to properly notify the vehicle operator regarding objects detected in the vicinity of the vehicle V. The generally two-dimensional display 20 showing notification information, including alerts and alarms (hereafter, "alert" for simplicity) from at least one sensor 100, 200, and preferably multiple sensors. The display 20 may be described as a generally-planar "top" side or plate of the unit 15, with holes/perforations of an audio speaker S at or near the center of the face, and with optional contours, ridges, and seams, and/or indicia resulting from aesthetic/design considerations and/or details for manufacture and assembly of the components of the unit 15, for example. The display unit 15 shown in the Figures includes a "V" logo, owned by Preco Electronics, LLC, of Boise, Id., USA, U.S. Registered™ 5262193, and registered in foreign countries (International Registration No. 1332615). The logo is included in many of the Figures to help orient the viewer as to what side of the display 20 is the "front" of the display 20 that emits display patterns indicative of objects at the front of the vehicle; the V shape of the logo opens up (is widest) in the direction corresponding to the front of the display unit representing the front of the vehicle.

As shown to best advantage in FIGS. 2-4, an array of lights 1, 2, 4, 5, 7, 8, 10, and 11 (hereafter array of lights AL or lights AL) is provided in a ring/circle 22 near the circular/cylindrical outer perimeter 24 of the display 20. The lights of the array AL are numbered 1, 2, 4, 5, 7, 8, 10, and 11, as they preferably generally correspond to the hours numbers on the face of a 12-hour clock, that is, the locations of lights 1, 2, 4, 5, 8, 10 and 11 o'clock, respectively, on a 360 degree analog/traditional clock face. The array of lights AL may be described as providing to the operator a "view" of conditions 360 degrees around the vehicle, as lights 1, 2, 4, 5, 7, 8, 10, and 11 light up selectively (individually or in selected, "partitioned" groups) to indicate where, in the 360 degrees around the vehicle, objects are detected. The outer perimeter 24 of the display, likewise, is preferably circular in a top view, as in FIG. 2.

Each of lights 1, 2, 4, 5, 7, 8, 10, and 11 is preferably adapted to emit different colors of light, for example, by including in each light RGB (Red/Green/Blue) LEDs to allow for a broad range of colors to signify different levels of alert. The curved, translucent cover or housing of the LEDs, or "lens" herein, is provided at or near the outer surface of the display, as will be understood from the slightly-curved, elongated rectangles labeled as lights 1, 2, 4, 5, 7, 8, 10, and 11 in FIGS. 2, 9-14, 16-19, 23, 25, 27, 29-31, and 33. This way, upon actuation of the preferred-color LED(s) under each lens, by the firmware of the objection detection system, the desired color of light will be emitted from the entire, or substantially the entire, lens.

The display unit 15 informs an operator of objects around the vehicle according to the design of the object detection system. For example, an object detection system may be designed for highway use, for construction site use, and/or city and town use, and, as such, may be designed for only moving objects in certain embodiments, for moving and stationary objects in certain embodiments, and/or for moving objects and/or stationary objects only in certain regions or lanes, but not in other regions such as adjacent sidewalks, for example. Notification to the operator, of the detection of objects according to any of these or other designs, will help the operator successfully and safely drive and maneuver the vehicle without accidents and without harming people, vehicles, or other objects. Hereafter, "operator" is used to indicate a driver or other operator of a vehicle or of equipment, and/or various personnel that may be on/in the vehicle/equipment to manage or assist in management of movement and/or other operation of the vehicle/equipment. The preferred embodiments of the invention are for human-operated vehicles/equipment, and may be described as comprising certain embodiments of a "human machine interface" or HMI. Hereafter, "alert" is used to include various types of notification to the human operator, including alerts and alarms of various levels and styles, including those that signal with light and optionally also with sound. Hereafter, "vehicle" is used to include various vehicles and equipment, such as trucks, trailers, automobiles, heavy vehicles such as utility, repair, construction, mining and waste vehicles, and other vehicles and equipment.

The preferred display unit 15 alerts the operator of potential threats much more effectively than conventional displays, because all the sensor information is presented in one central location, that is, on the display 20 of the display unit 15. While one or more sensors are used on a single vehicle, preferably only a single display 15 is used for the alerts. This way, the operator need not look at or listen to separate displays for each sensor. Instead, the operator may look at the single display that performs alert functions for all the sensors, for example, with the alerts selected or prioritized for the location of the sensor (for example, front, right, rear, and/or left, as is judged most important for a particular vehicle type and typical operation) and/or for the proximity/closeness of the detected object relative to the vehicle. In certain embodiments, an auxiliary output may be included in the object detection system, to alert other people in the vicinity of the vehicle and/or other monitoring or management facilities. For example, the auxiliary output may comprise corresponding notifications and alarms/alerts regarding the same sensor information, and may be made locally and/or remotely, for example, using audible beepers, buzzers and horns, and backup alarms or other alarms/alerts. The auxiliary output may be made to the outside surroundings of the vehicle to notify/warn people other than the operator, and/or may be made wirelessly to a control room or headquarters, for example.

The display unit 15 is preferably mounted in the vehicle cab C or other operator station or platform (hereafter, "cab"), for example, generally vertically, or up to about 45 degrees from vertical for example, on or in the dashboard or other instrument panel of the cab, so that the operator can easily see the display during operation of the vehicle. See FIGS. 1 and 2. The display 20 of the unit 15 is called the "top" of the unit 15 herein, in order to differentiate from the front side F (of unit 15 and display 20) corresponding to alerts relating to the front F of the vehicle, the rear side R (of unit 15 and display 20) corresponding to alerts relating to the rear R of the vehicle, and the right RT and left L sides (of the unit 15 and display 20) corresponding to alerts relating to right RT and left L sides of the vehicle. The display 20 need not, and preferably is not mounted to be horizontal, because, when mounted in a generally vertical position with front side F upward, an operator will understand that the front side F of the display 20 corresponds to, and produces alerts regarding, the front side F of the vehicle and the forward-driving direction.

Therefore, the display unit 15 should be mounted on, or installed in, the vehicle cab C dashboard or other instrument panel, with the plane of the display 20 at an orientation/angle making viewing by the operator convenient during driving, and wherein a front side F of the display 20 is oriented to "point generally toward" the front side F (in FIG. 1) of the vehicle and the forward-driving direction. A mount 34 may be provided for installing the display unit 15, and for allowing pivoting or other adjustment of the display 20 orientation and tilt as desired, for convenience and preference of the operator. Even with adjustments of said orientation/tilt, the operator understands, as when a person holds and views a traditional map, that the front side F, rear side R, right side RT, and left side L of the display 20 (FIG. 2) correspond to directions in front of (forward) F, behind (rear) R, to the right RT, and to the left L of the vehicle (FIG. 1).

Most or all the object detection sensor information is presented on the display 20, and the display unit 15 and its display 20 are, in certain embodiments, in the range of 1-5 inches or more preferably 1-3 inches, in diameter, thus minimizing the "footprint" or "face-print" of the display unit so that it fits well on/in the dashboard or other instrument panel of the vehicle. This allows the operator to assess the conditions surrounding the vehicle easily with a quick glance at this one display 20, eliminating need for multiple displays for object detection in a single vehicle. Thus, preferred embodiments accomplish sensing and alert of objects on multiple sides of the vehicle with a single display unit 15 having a single, compact display surface/face 20, for example, accomplishing full coverage around a vehicle while eliminating the cost, and the potential for confusion or distraction on the operator's part, of using 4 separate screens or other displays (1 for each side of the vehicle, for example).

The display 20 is operatively connected to the other components of the object detection system (400, see FIG. 40), so that the display 20, including its speaker S, receives control signals to produce the light and/or sound alerts visible to the operator. For example, the display 20 is operatively connected to at least one object detection sensor 100, 200, and 300 via associated signal processing firmware/software and alert actuation/control firmware/software 320, 330 that are typically contained within the housing 325 of the sensor 100, 200, 300 and/or the housing 30, 335 of the display unit 15, 15'. Electrical/electronic/data cables and connectors 32, 303 between the sensor unit 100, 200, 300 and the display unit 15, 15' may be accomplished by commercially-available cable and connectors, such as DEUTSCH™ and/or CONXALL™ connectors. Power may be supplied to the object detection system by connection to the electrical power system/circuit of the vehicle. CAN (Controller Area Network or "CAN bus") is preferably used to communicate sensor information to the display, for example, operating at 250 Kbps or 500 kbps.

Especially-preferred object detection systems, in which the display unit 15 and its display 20 may be included, are preferably radar object detection systems, such as PREVIEW™ and SIDE DEFENDER™ radar systems, available from PRECO ELECTRONICS, LLC, of Boise, Id., USA (https://preco.com). In such systems, each sensor unit is preferably typically mounted on a different outside side surface of the vehicle, and may be included during original equipment manufacture (OEM) or may be retrofit onto a vehicle after manufacture of the vehicle. Alert actuation signals from each and every sensor unit are preferably sent by electrical/electronic/data cabling and connectors to the display unit in the vehicle cab, which also may also be provided OEM or as a retrofit to the vehicle. In certain embodiments, the radar sensor (transmitter and receiver) hardware, and the hardware, firmware and/or software for the controlling the transmitter and processing the individual sensor's receiver, and for determining and sending an alert transmission to the display unit 15, is preferably in each sensor 100, 200. Hardware, firmware, and/or software mainly or entirely for operation of the display 20, including speaker S, is preferably provided inside the display unit 15 housing 30. This display unit hardware/firmware/software may be adapted for processing and prioritizing signals from the sensors, and then controlling the display by partitioning and actuating the desired locations and combination of lights, colors of lights, flashing (if any), and sounds (if any). Object detection signal prioritization is important for cases where there are multiple sensors and one or more or all of the sensors are configured to detect multiple objects at the same or generally the same time. The multiple objects detected by a single sensor may not be of equal concern or danger and prioritization allows signaling to, and control of, the display 20 to alert the most concerning/dangerous object detection for each sensor. In certain embodiments, said prioritization may be based on the relative distance from the vehicle of the objects detected by each sensor, or in certain embodiments, relative movement or direction of relative movement of the object and the vehicle.

Referring again to the preferred embodiment 15, with display 20, depending on how many sensors the display unit 15 and its display 20 are adapted/configured for, the firmware is adapted to automatically determine how to partition the lights of the array AL for notifying the operator of the location of the detected object and how to graduate/escalate the display. An example is a system with 1 rear sensor and/or 1 front sensor 100, wherein all 4 lights 3-6 on the rear side of the display 20 are utilized for a rear sensor, and/or all 4 lights 1, 2, 7 and 8 on the front side of the display 20 are utilized for a front sensor.

FIG. 8 illustrates an embodiment wherein a sensor unit 100 is installed on a rear side of a vehicle to detect objects in multiple zones behind the vehicle, wherein different numbers and colors of light colors, and light flashing, are used to signal the zone, and therefore the urgency/threat-level, of a detected object behind the vehicle. In the embodiment of FIG. 8, the rear sensor 100 detect objects in five zones of increasing distance from the back of the vehicle, that is, zones 1 through 5. The alert displays/patterns for each of the zones are illustrated, wherein R and Y correspond to a red light and a yellow light, respectively. Beside the display portrayals in FIG. 8 is noted which of the zones include flashing of the red R, or yellow Y, lights. Specifically, an object detected in zone 1 is potentially of great concern/danger, so the rear half of the lights (the rear 180 degree sector 50, see FIG. 9) flash red. An object detected in zone 2 is of somewhat less concern/danger, so red lights R flash in the rear 90 degree sector 52 (the two rearmost lights, see FIG. 9), and one light on each side of that 90 degree sector flashes yellow Y. Regarding zones 3 and 4, which are increasingly less concerning/dangerous, two yellow lights Y in the rear 90 degree sector 52 (see FIG. 10) flash for zone 3 and are lit but non-flashing in zone 4. An object detected in zone 5, of the least concern due to its greatest distance of the zones from the vehicle, causes sector 50 of two blue lights B (see FIG. 11) to be lit but non-flashing. Thus, different colors of lights may be used for the highest alert (H, in FIGS. 9-14) and for a lower alert (L, in FIGS. 9-14), preferably red R and yellow Y, respectively. Further, yet another color is used for a caution-worthy but probably not dangerous indication (C, in FIGS. 9-14), for example, blue B.

Figure 9:
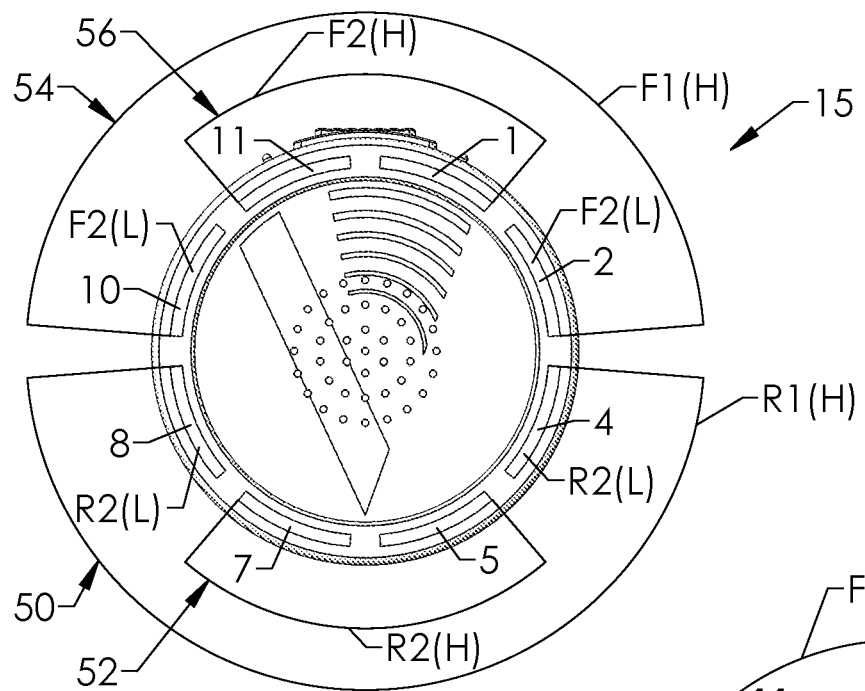
FIG. 9 illustrates display patterns on the display surface of the unit of FIG. 2, when a front sensor and a rear sensor detect objects in either zone 1 or 2, in front or in back of the vehicle, respectively.
Figure 10:
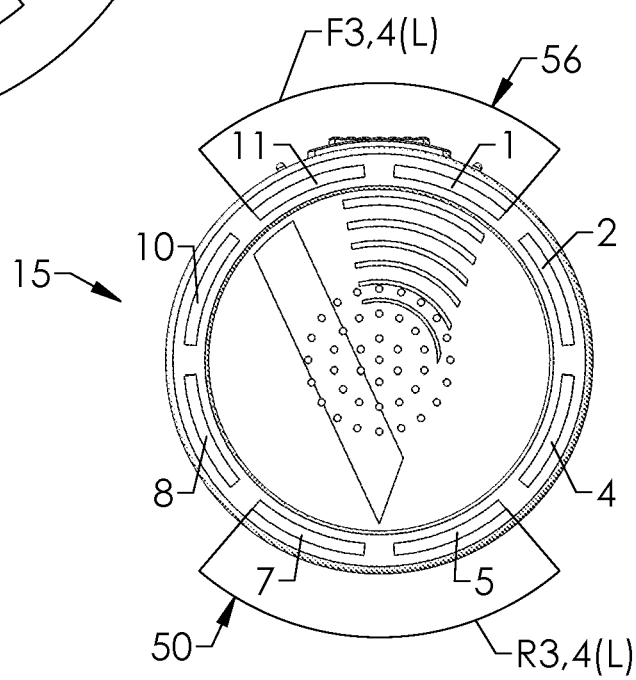
FIG. 10 illustrates display patterns on the display surface of the unit of FIG. 2, when a front sensor and a rear sensor detect objects in zone 3 or 4, in front or in back of the vehicle, respectively.
Figure 11:
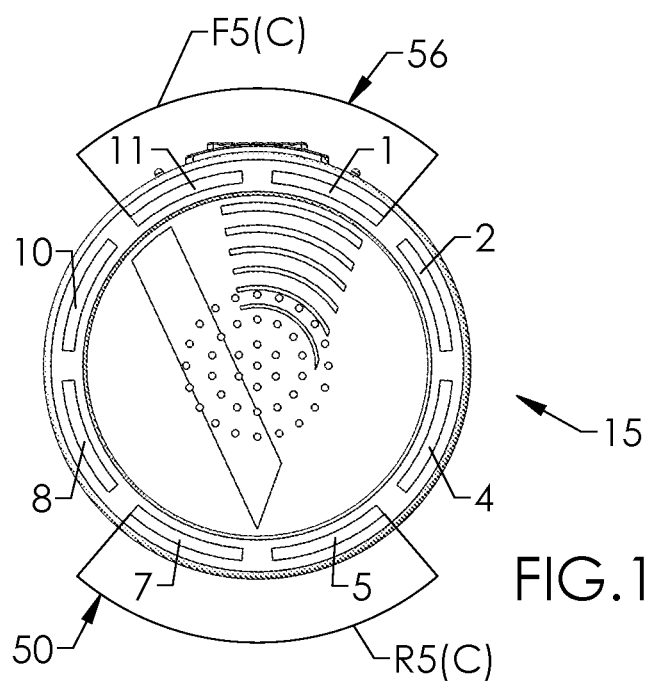
FIG. 11 illustrates display patterns on the display surface of the unit of FIG. 2, when a front sensor and a rear sensor detect objects in zone 5, in front or in back of the vehicle, respectively.

FIGS. 9-11 illustrate, for an object detection system that has only front and rear sensors, how the object detection system partitions the lights of the display for the two sensors into two, front and rear, 180 degree sectors ("or halves" or "portions"). FIGS. 9-11 also illustrate how the alerts are varied to indicate the urgency/threat-level due to the zone of the detection.

FIG. 9 illustrates the display alert patterns when detections are in zones 1 and 2. F1(H) stands for a front side zone 1 alert, which will be a high alert H (for example, red), over the front half 180 degree sector 54 due to the closeness of zone 1 to the vehicle. F2(H) in the frontmost 90 degree sector 56 and F2(L) in the adjacent two lights, indicate a front side zone 2 alert, using two colors (red for the high level H, and yellow for the lower level L, for example), both of which colors may flash on and off. R1(H), and R2(H) and R2(L), in FIG. 9, are detection and alerts for a rear sensor on the rear side of the vehicle, and are analogous to F1(H), and F2(H) and F2(L), for example a mirror image, of that described above in this paragraph for the front alerts.

It will be understood from this disclosure and from FIGS. 8-11 that the display for an embodiment having only one of a front or a rear sensor will preferably be the front or the rear 180-degree sectors, respectively, of the display patterns shown in FIGS. 9-11, instead of the entire 360-degrees patterns shown in FIGS. 9-11.

Figure 12:
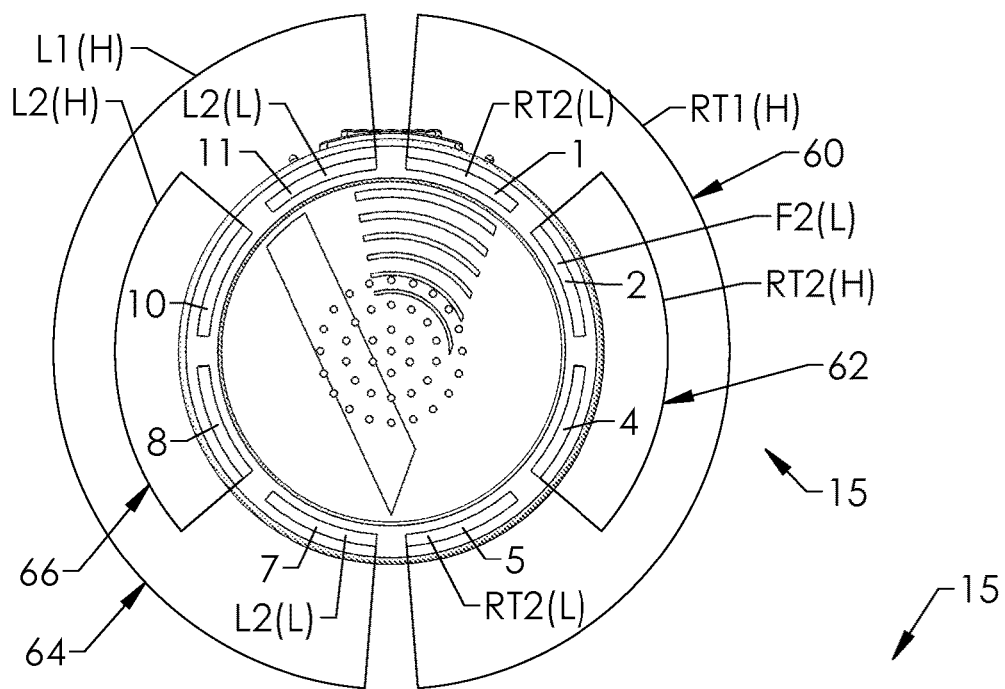
FIG. 12 illustrates display patterns on the display surface of the unit of FIG. 2, when a right sensor and a left sensor detect objects in either zone 1 or 2, to the right or the left of the vehicle, respectively.
Figure 13:
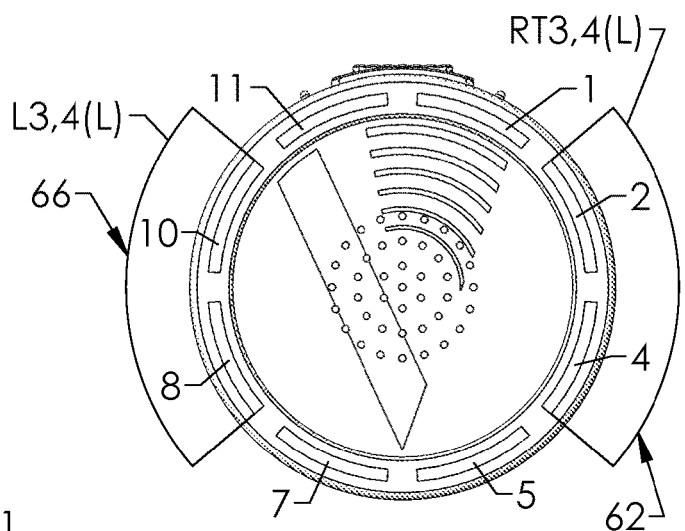
FIG. 13 illustrates display patterns on the display surface of the unit of FIG. 2, when a front sensor and a rear sensor detect objects in zone 3 or 4, to the right or the left of the vehicle, respectively.
Figure 14:
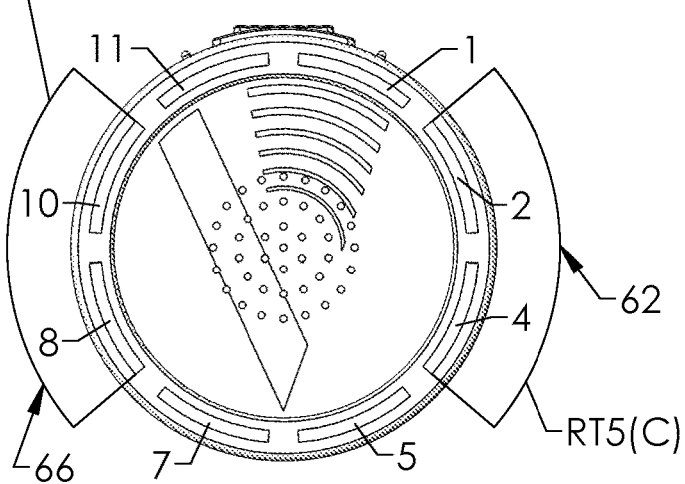
FIG. 14 illustrates display patterns on the display surface of the unit of FIG. 2, when a front sensor and a rear sensor detect objects in zone 5, to the right or the left of the vehicle, respectively.

FIGS. 12-14 illustrate, for an object detection system that has only right and left sensors, how the lights of the display surface/face may be partitioned by the object detection system for alerts from the right and left sensors into two, right and left, 180-degree sectors. FIGS. 12-14 also illustrates that the alerts are also varied to indicate the urgency/threat-level due to the zone of the detection. Further, it may be understood from this disclosure and FIGS. 12-14 that the display for an embodiment having only one of a right or left sensor will preferably be the right or the left 180-degree sectors, respectively, of the display patterns shown in FIGS. 12-14, instead of the entire 360-degrees patterns shown in FIGS. 12-14.

FIG. 12 illustrates alerts in zones 1 and 2. RT1(H) stands for a right side zone 1 alert, which will be a high alert H (for example, red), over the right 180 degree sector 60 due to the closeness of zone 1 to the vehicle. RT2(H) in the rightmost 90 degree sector 62 and RT2(L) in the adjacent two sectors, indicate a right side zone 2 alert, using two colors (red for the high level H, and yellow for the lower level L, for example), both of which colors may flash on and off. L1(H), and L2(H), using sectors 64 and 66 respectively, and L2(L), in FIG. 12, are detection and alerts for a left sensor on the left side of the vehicle, using sector 64, and are analogous to L1(H), and L2(H) and L2(L), for example a mirror image, of that described above in this paragraph for the right alerts.

FIG. 13 illustrates the sectors 62, 64 and alerts used for right and left sensors in zones 3 and 4. RT3, 4 (L), stand for right side alert in either zone 3 or 4, using a low level alert L (yellow, for example) over two sectors (the right 90 degrees) for both zones, wherein the zone 3 alert may flash on and off as it is slightly more concern than the zone 2 alert. L3,4(L), in FIG. 13, is the detection and alerts for a left sensor on the left side of the vehicle detecting in zones 3 and 4, and are analogous to RT3, 4 (L), for example a mirror image, of that described above in this paragraph for the right alerts.

FIG. 14 illustrates the sectors 62, 64 and alerts used for right and left sensors in zone 5. RT5(C) stands for the front side zone 5 alert, using a cautionary level C (blue, for example), over the right 90 degree sector 62. L5(C), in FIG. 14, is the detection and alert, using left 90 degree sector 66, for the left sensor on the left side of the vehicle detecting in zone 5, and is analogous to RT5(C), for example a mirror image, of that described above in this paragraph for the right sector and alert.

Thus, it may be understood, from the above description of FIGS. 8-14, that the emitted alerts decrease in visual and/or audio severity/impact, corresponding to the decrease in concern/danger, from the close zone 1 to the distant zone 5. This decrease in concern/danger may be shown by change of color, for a high alert red and lower alert yellow, to a cautionary lowest alert blue, to differentiate between the alerts. And/or, change/differentiation in alerts may be shown by change of the number of lights, or size of sector of lights, from a larger number to a smaller number. Further change/differentiation between alerts may be made by additional light features of flashing, wherein the alert severity is understood to be more severe when light are flashing. A further change/differentiation may include further graduation/escalating by the loudness and/or frequency of sounds emitted from the speaker S. For example, sounds may be emitted at a fast frequency for detections in zone 1, with decreasing frequency for zones at increased distance from the vehicle. For example, in FIG. 20, an audible alert of eight beeps per second (b/s) is emitted for detections in zone 1, four b/s for detections in zone 2, two b/s for detections in zone 3, and only one b/s in zones 4 and 5.

Another example of an objection detection system using embodiments of the display is a "combination" system, including wherein front and/or rear sensor(s) are used in combination with right and/or left sensors, for example, including systems where sensors are used on all sides of the vehicle (4 sensors, that is, 1 front, 1 rear, 1 left, 1 right). Such combination systems preferably use 2 lights per vehicle side, that is, 4 lights, 6 lights, or 8 total lights for 2 sensors, 3 sensors or 4 sensors. Four lights are used for 2 sensors at generally 90 degrees from each other (a front or rear sensor, plus a right or left sensor); see FIGS. 15 and 15A. Six lights are used 3 sensors (two sensors diametrically opposed plus one sensor at 90 degrees to those sensors). Eight lights are used for four sensors on four vehicle sides; see FIGS. 16-19. Thus, the firmware automatically partitions the lights 1, 2, 4, 5, 7, 8, 10, and 11 in the array AL of display 20 in different manners to accommodate the particular combination. In many embodiments, a single sensor, rather than multiple sensors, are provided for a given side of the vehicle, as the preferred radar sensor units each have a wide radar antenna pattern, which will detect objects all along/adjacent the side of the vehicle, for example, all along the length of the right or left side, and for a significant distance out from that side, of the vehicle, even when the vehicle is a truck and trailer combination. Thus, in certain embodiments, the total of sensors is expected to be four.

Figure 15A:
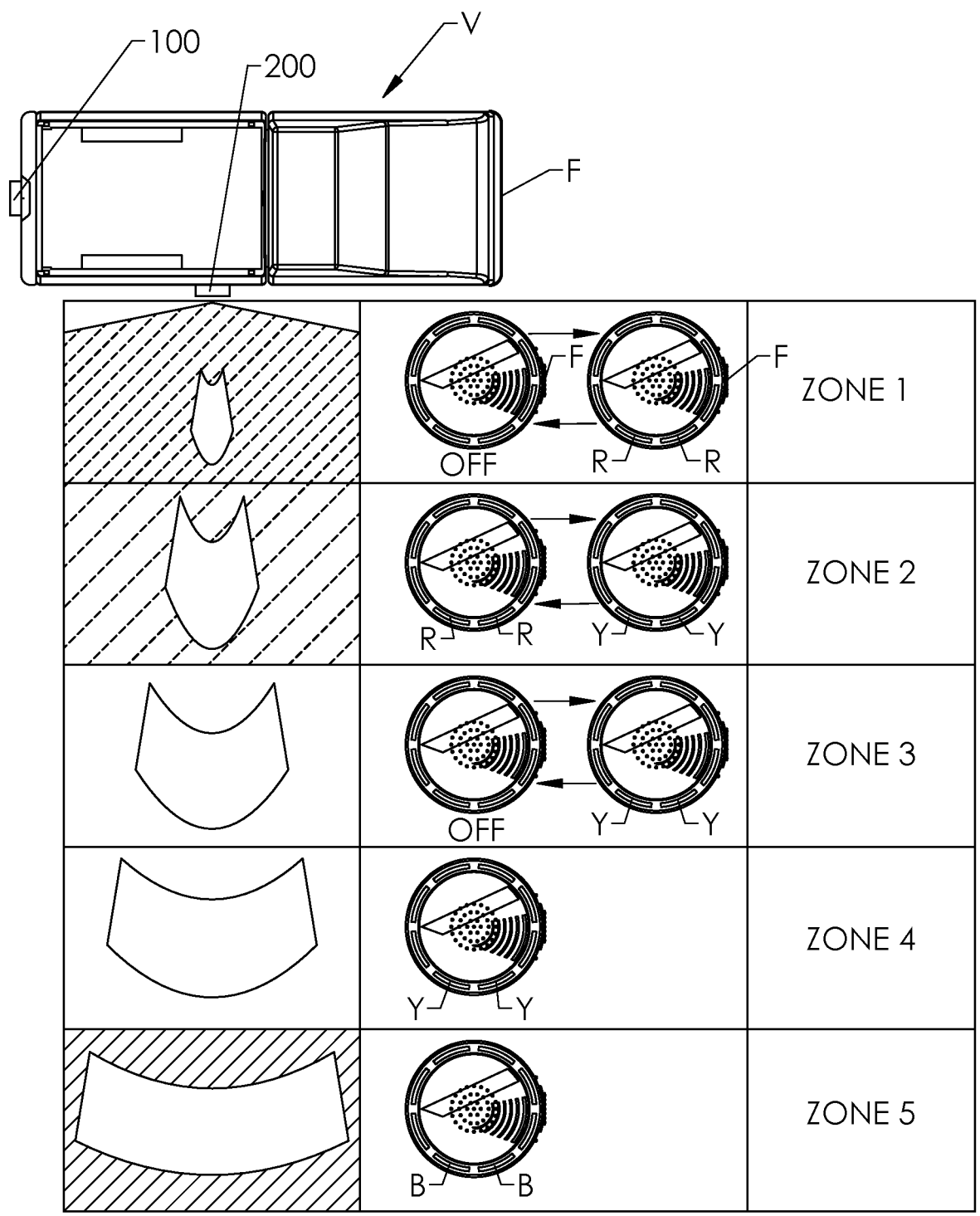

One embodiment of a "combination" system comprising at least one of a front and rear sensor and at least one of a right and left sensor is portrayed in the combination of FIGS. 15 and 15A. Sensor unit 100 is on the rear of a vehicle (FIG. 15), and sensor unit 220 is on the right side of the same vehicle (FIG. 15A), so that the object detection system partitions the alert lights to account for the two sensors being at or about 90 degrees from each other on the vehicle, and hence the alert lights being 90 degrees from each other on the display surface/face. This two sensor, 90-degree-apart display pattern is this differentiated from diametrically-opposed, 180-degree apart display pattern discussed above for systems comprising only front and back sensors, or comprising only right and left sensors. FIGS. 15 and 15A also show how the alerts are varied to indicate the urgency/threat-level due to the zone of the detection.

Figure 16:
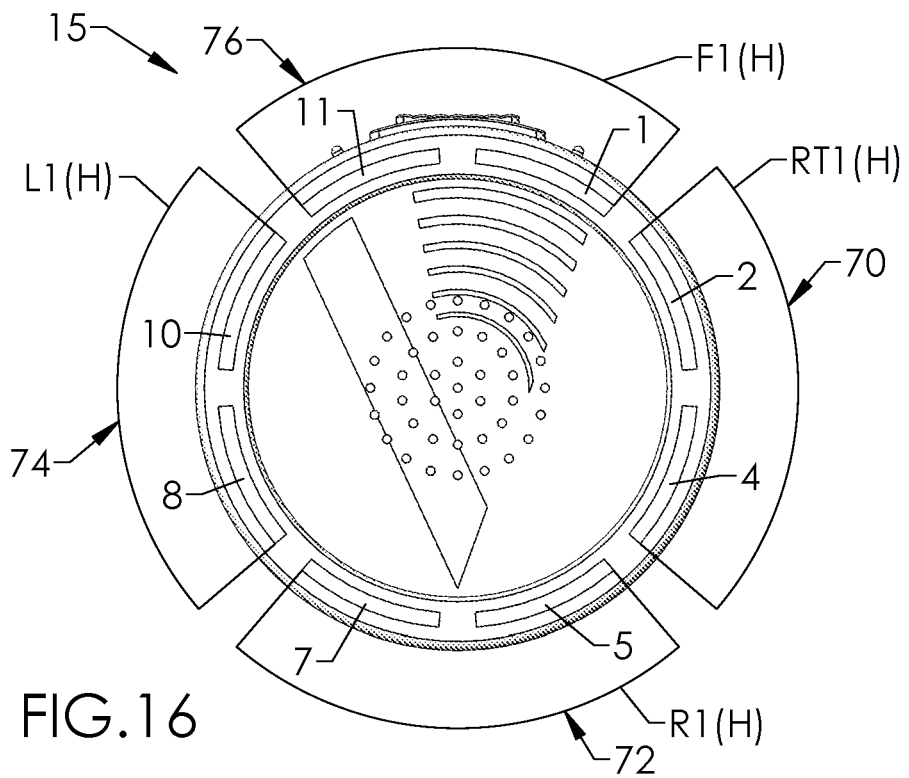
FIGS. 16-19 illustrate display patterns on the display surface of the unit of FIG. 2, for a system having a front, a rear, a right and a left sensor.
Figure 17:
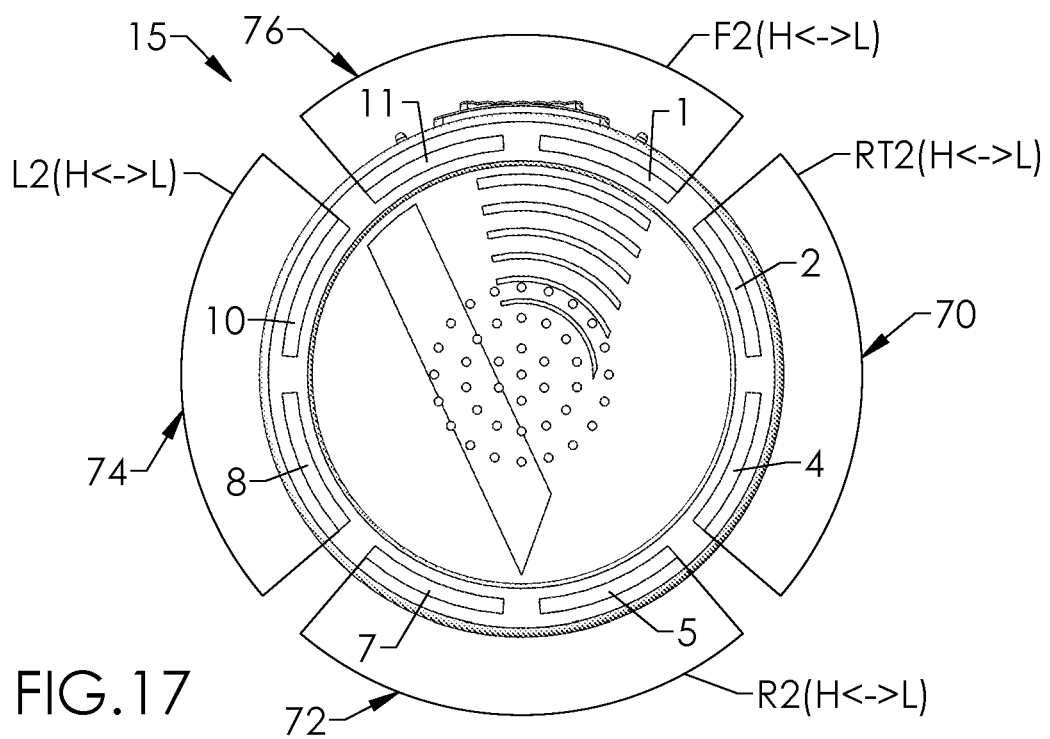
Figure 18:
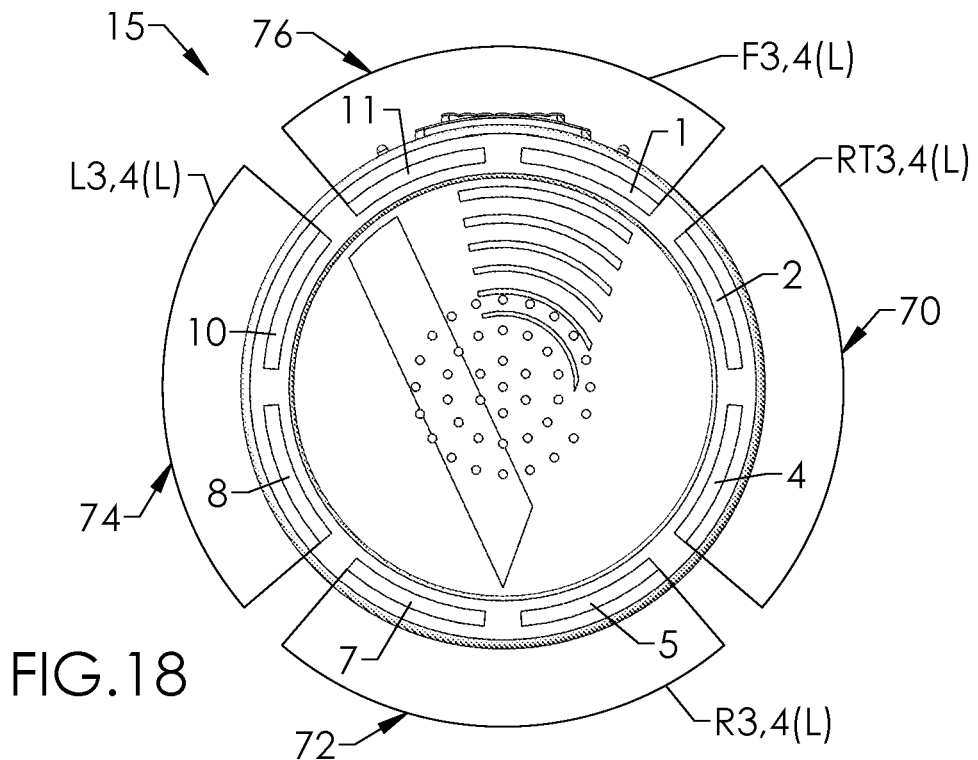
Figure 19:
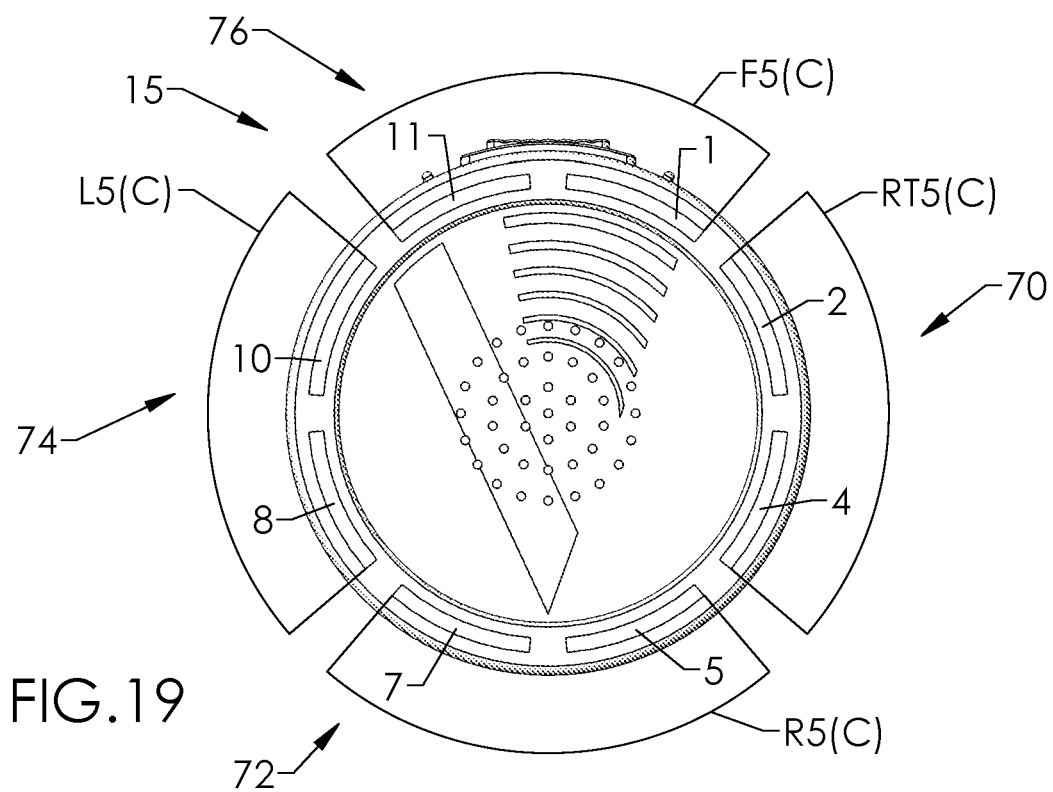

FIGS. 16-19 illustrate, for a combination system having 4 sensors, how the lights of the display may be partitioned by the object detection system, into four 90-degree sectors 70, 72, 74, 76, of the display. This way, input from each sensor preferably results in light alerts in only $\frac{1}{4}^{th}$ of the display. FIGS. 16-19 also illustrate how the alerts may also be varied to indicate the urgency/threat-level due to the detected zone of each sensor. FIG. 16 illustrates high alerts, for four zones 1, in all four sectors 70, 72, 74, 76. FIG. 17 illustrates flashing alerts (back and forth between high and low alerts) for four zones 2, in all four sectors 70, 72, 74, 76. FIG. 18 illustrates low alerts for four zones 4 or four zones 4, in all four sectors 70, 72, 74, 76. FIG. 19 illustrates cautionary alerts for four zones 5, in all four sectors 70, 72, 74, 76.

Figure 20:
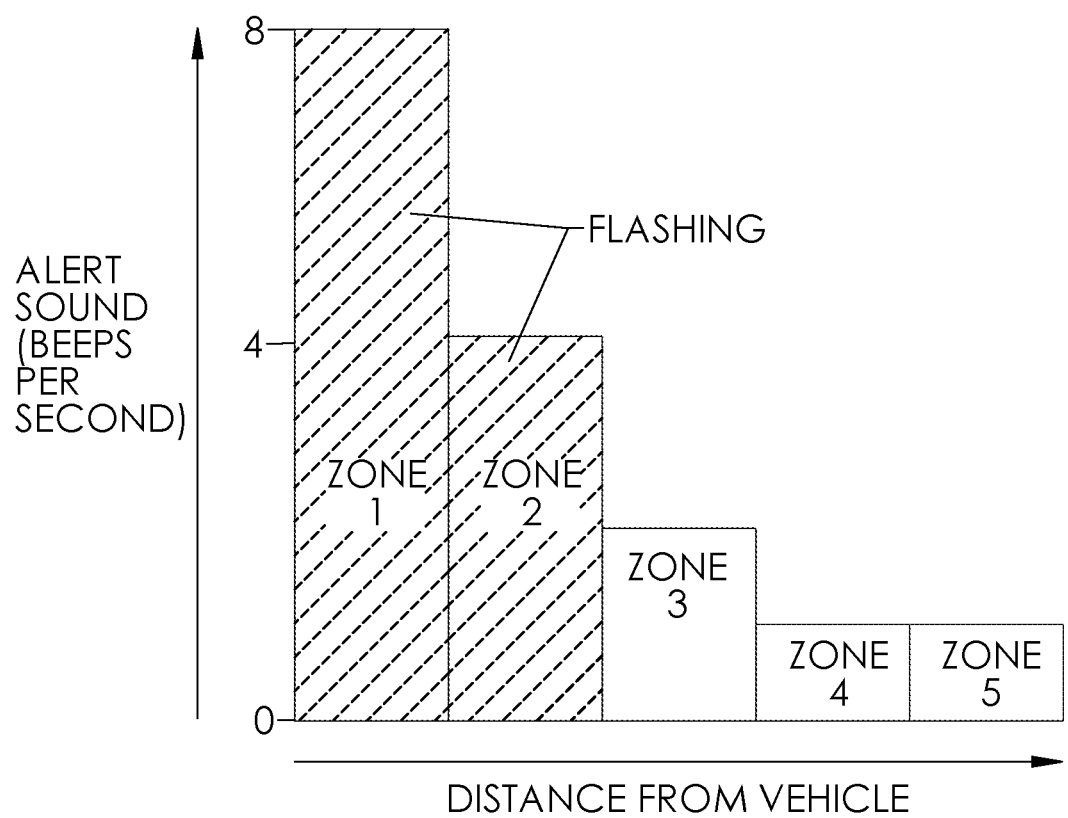
FIG. 20 is a bar graph illustrating an embodiment of escalated alerts, by varying alert sound frequency based on zone/distance from the vehicle and causing alert lights to flash based on the zone/distance.

FIG. 20 is a bar graph illustrating one embodiment of graduating/escalating visual and audio alerts, wherein lights on the display are supplemented by varying the frequency of sound alerts and by flashing of the lights.

Figure 21:
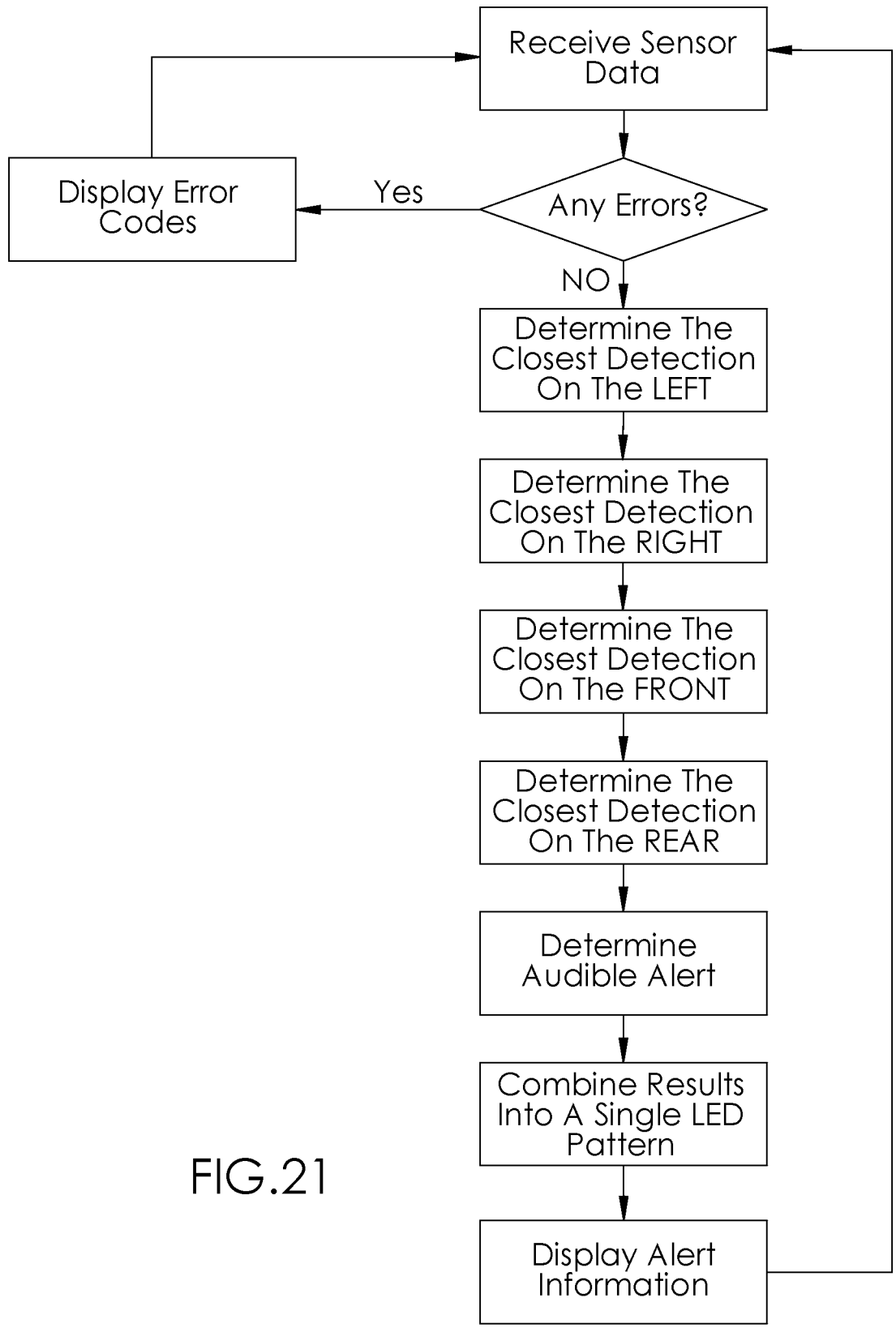
FIG. 21 is a logic diagram showing one embodiment of a method of determining an alert pattern for the display unit of FIG. 2.

FIG. 21 is a logic diagram for certain embodiments of the display unit, wherein four sensors are provided on four sides of the vehicle and the prioritizing and partitioning firmware of the object detection system, typically housed inside the display unit, determines the single alert pattern of lights and optionally sound at a given time, for example, based on the alert patterns shown for the various sensors and zones in FIGS. 16-19.

FIGS. 22-25 schematically illustrate to best advantage how the method of FIG. 21 controls the alert pattern of the display 20, for a system comprising sensors 100, 200 on each of four sides of the vehicle. FIGS. 22-25 illustrate how the display is partitioned to use all 360 degrees of the display, with each sensor "controlling" (via the hardware/firmware/software 320, 330 of FIG. 40) the lights of one fourth of the display. In other words, based on where objects are found, the display will look very different and have color signals and/or flashing signals emitting from all around the display face. It will be understood from this Description that the hardware/firmware/software 320, 330 of the system (400 in FIG. 40) may be described as the controller of the system, or the controller of the sensor and/or display.

Figure 22:
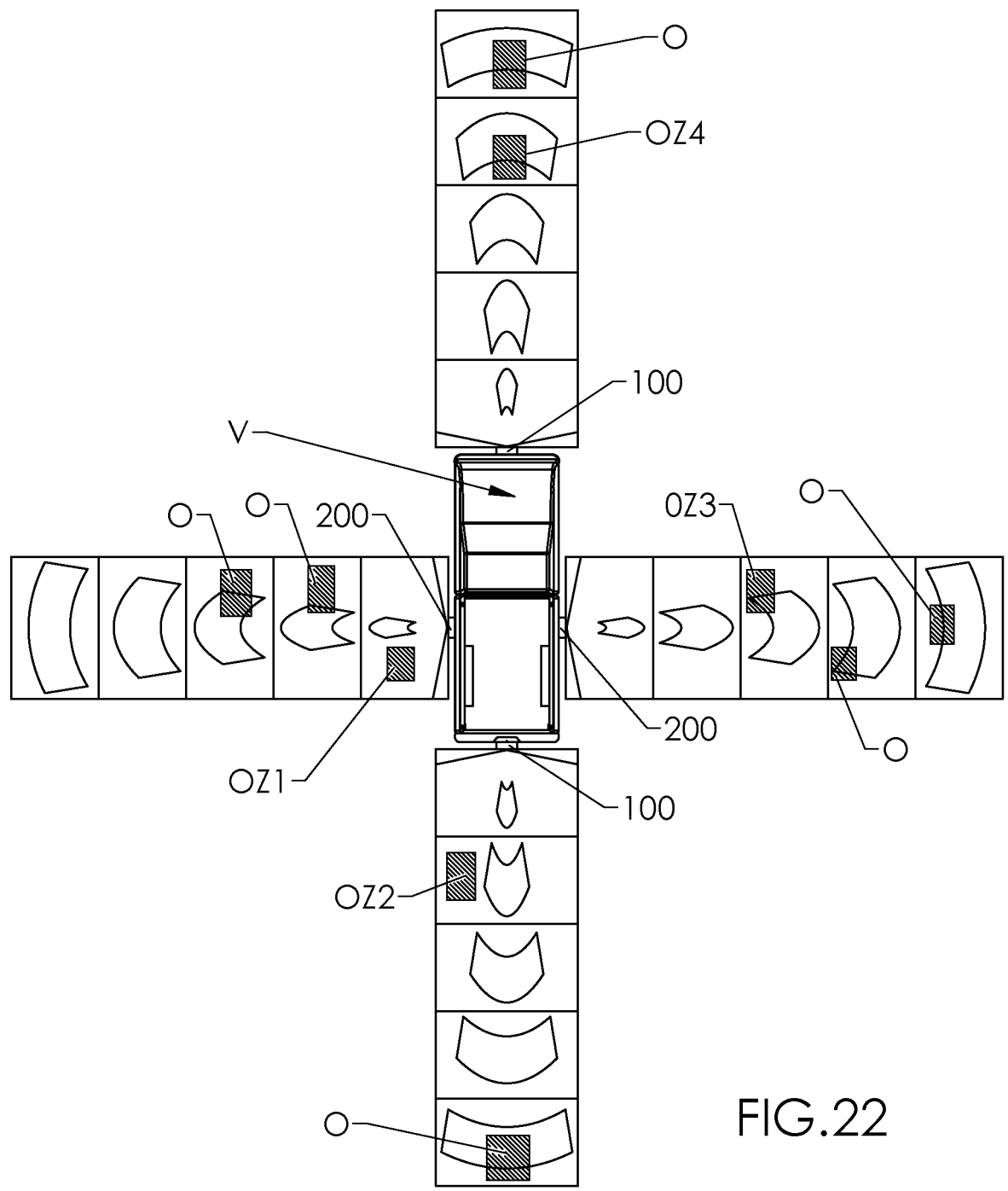
FIG. 22 is a top view of an exemplary vehicle with four radar sensors, showing simultaneous detection of multiple objects on each side of the vehicle, and indicating the prioritization of the closest object detected by each sensor.
Figure 23:
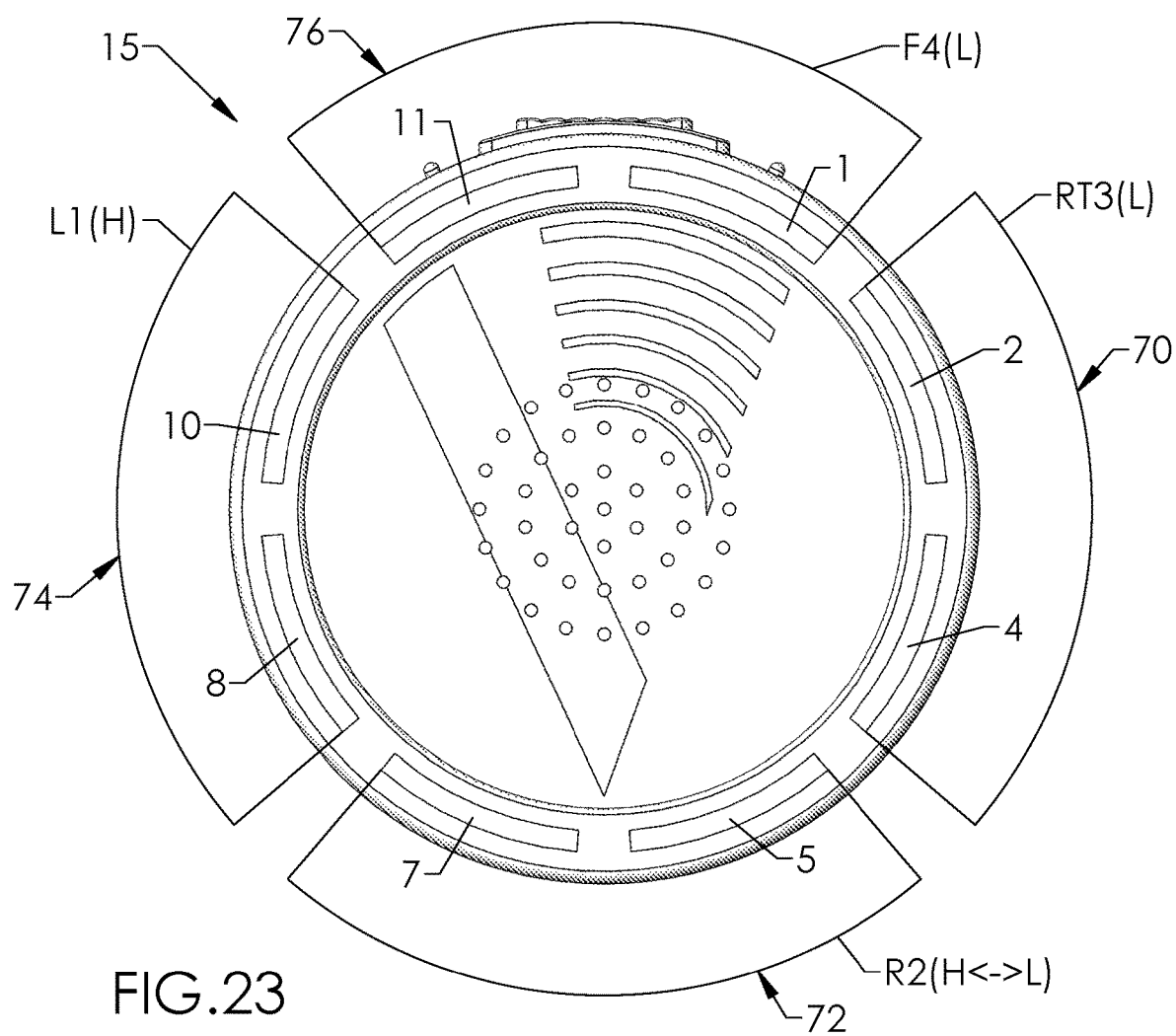
FIG. 23 is a top view of the display provided in the vehicle of FIG. 22, wherein the display is partitioned to alert the operator of the highest-priority object detected by each sensor, resulting in the data/alert from each sensor simultaneously being emitted and corresponding to one-fourth of the whole display face.

In FIG. 22, each sensor 100, 200 detects multiple objects O in different distance zone relative to the vehicle. Preferably, the measured distance away from the vehicle are divided into multiple zones. Various zone sizes may be used, for example, each zone may be a car length at the rear and in the front, and each zone may be a lane width at the right and left. In FIG. 22, the left sensor detects an object OZ1 in the closest zone (zone 1) as well as two other objects O farther from the left side of the vehicle. The rear sensor detects an object OZ2 in the second closest zone (zone 2) as well as one other object O farther from the rear side of the vehicle. The right sensor detects an object OZ3 in the third zone, and objects in each of the fourth and fifth zones. The front sensor detects an object OZ4 in the fourth zone, and another object in the fifth zone. FIG. 23 shows the display, as a result of the detections of FIG. 22, is partitioned into fourths, each fourth having two lights, wherein each sensor's one-fourth of the display is used for that sensor's highest-priority object detection, producing four independent and frequently different light displays simultaneously on the 360 degree display. "Frequently different" is used because it is common, except in very heavy traffic or a crowded city environment, that the closest objects detected on each side of the vehicle are at different distances from the vehicle, that is, in different zones and therefore producing different levels of alert. Thus, in FIG. 23, a non-flashing, high alert color is at the left (for example, red), a flashing alert (between a high and low alert colors, for example, flashing between red and yellow) is at the rear, and a low alert color (for example, yellow) is at the right and the left. In certain embodiments and circumstances, at least three colors will be used, for example, including red and yellow for zones 1-4, and blue for zone 5.

Figure 24:
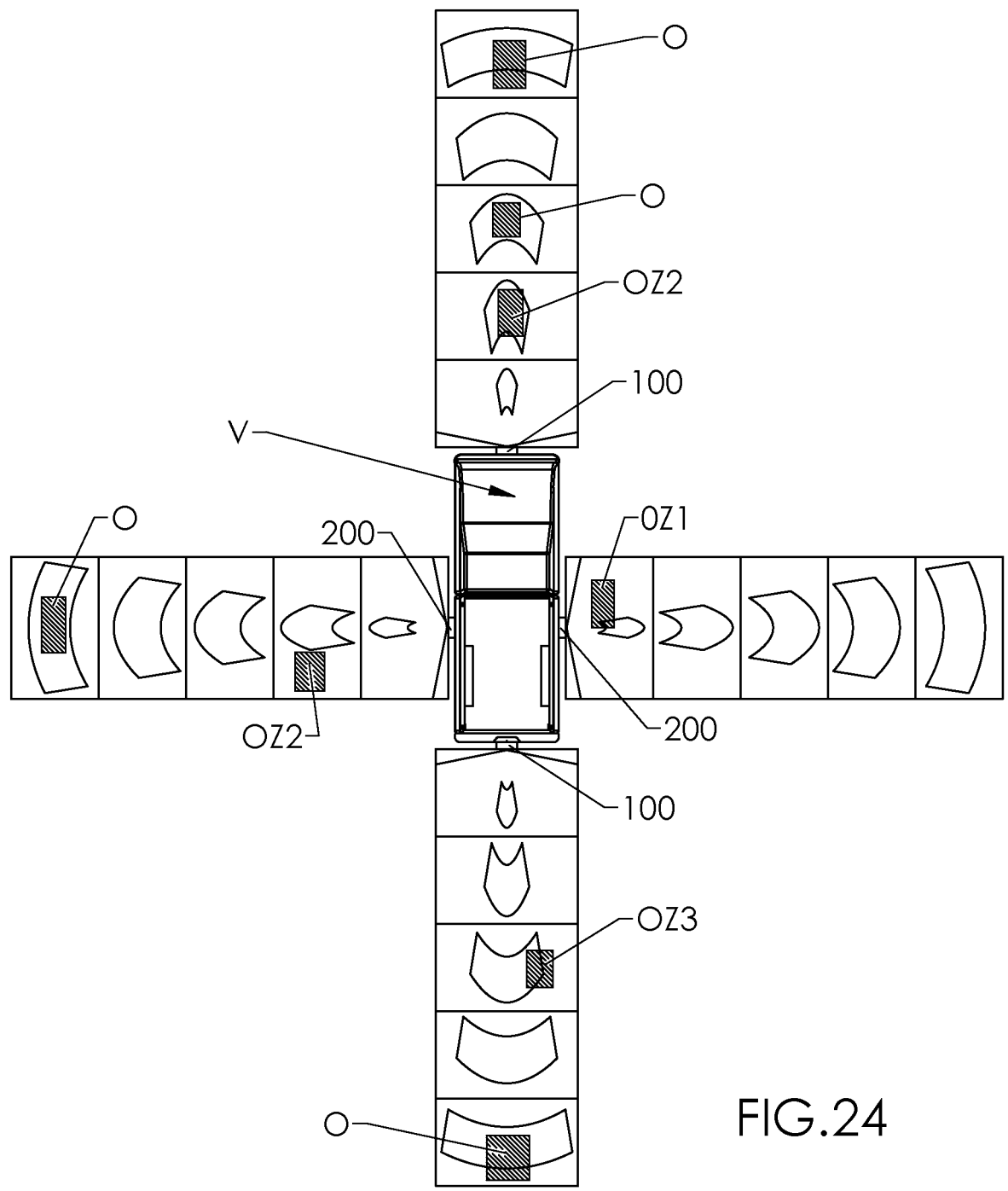
FIG. 24 is a top view of the vehicle and four radar sensors of FIG. 22, showing simultaneous detection of multiple objects on each side of the vehicle, and indicating the prioritization of the closest object detected by each sensor, wherein the objects are differently-located compared to FIGS. 22 and 23.
Figure 25:
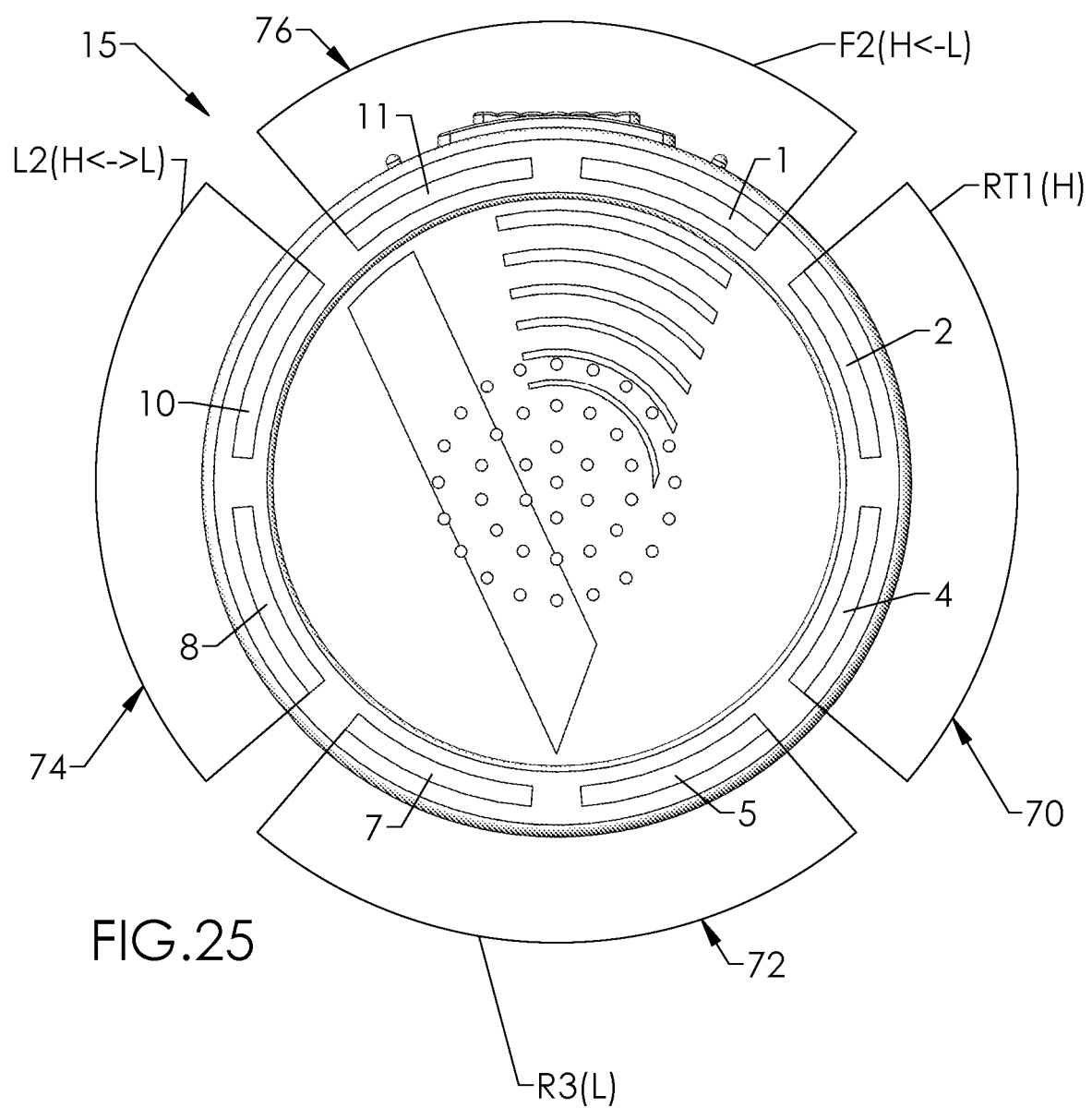
FIG. 25 is a top view of the display provided in the vehicle of FIG. 24, wherein the display is partitioned to alert the operator of the highest-priority object detected by each sensor, resulting in the data/alert from each sensor simultaneously being emitted and corresponding to one-fourth of the whole display face, but with different alert colors and/or flashing compared to that of FIG. 23.

In FIG. 24, each sensor 100, 200 detects differently-located and/or differently-spaced, multiple objects O. In FIG. 24, the right sensor detects the closest object, that is, an object OZ1 in the closest zone (zone 1) and no other objects at the right. Both of the left and the front sensors detect objects OZ2 in the second zone (zone 2), while the left sensor detects only one other object O in distant zone 5, and the front sensor detects two other objects O in zone 2 and 5. The rear sensor detects an object OZ3 in the third closest zone (zone 3) and one other object O farther away. FIG. 25 shows the display, as a result of the detections of FIG. 24, is partitioned into fourths, each fourth having two lights, wherein each sensor's one-fourth of the display is used for that sensor's highest-priority object detection, producing four independent and frequently different light displays simultaneously on the 360 degree display. Thus, a non-flashing, high alert color (for example, red) is at the right, a flashing alert (between a high and low alert colors, for example, red and yellow) is at the left and at the front, and a low alert color (for example, blue) is at the rear.

Figure 26:
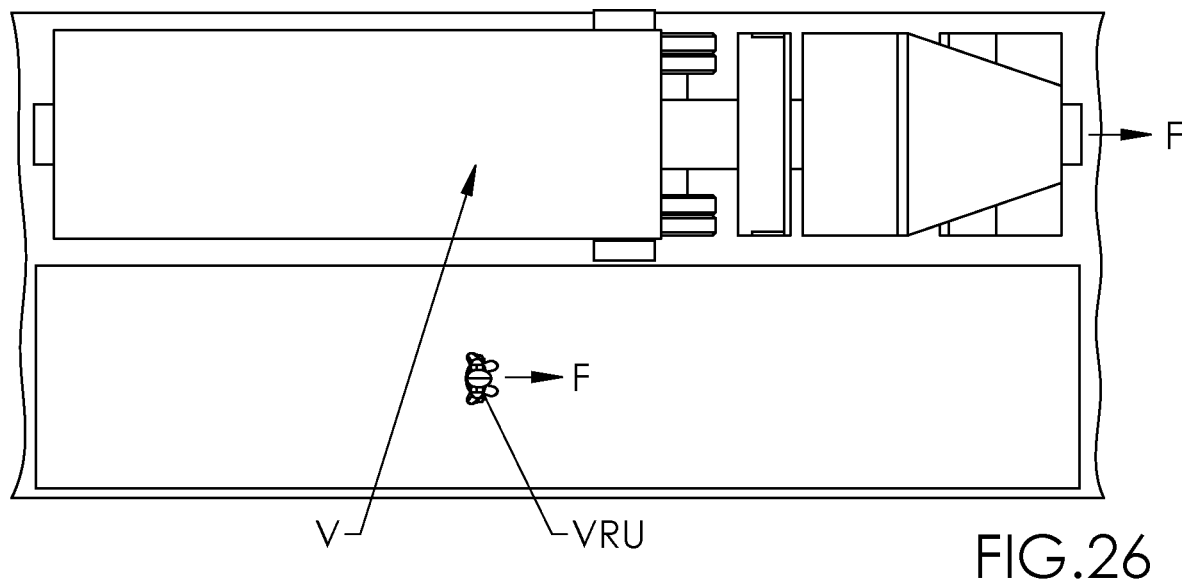
FIG. 26 is a top view of an exemplary vehicle wherein a person (such as a vulnerable road user) is moving/traveling beside and in the same direction as the vehicle.
Figure 27:
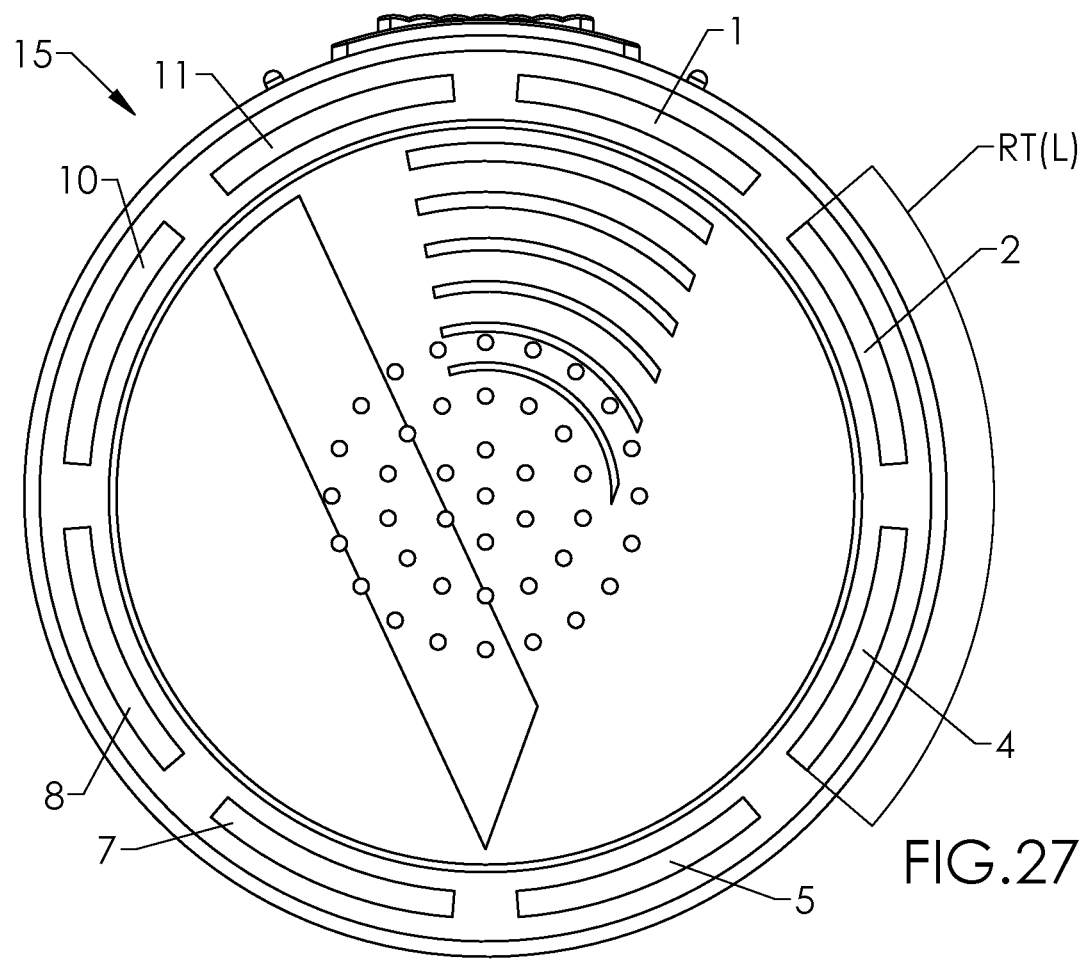
FIG. 27 illustrates the alert pattern on the display surface of the unit of FIG. 2, for the situation in FIG. 26.
Figure 28:
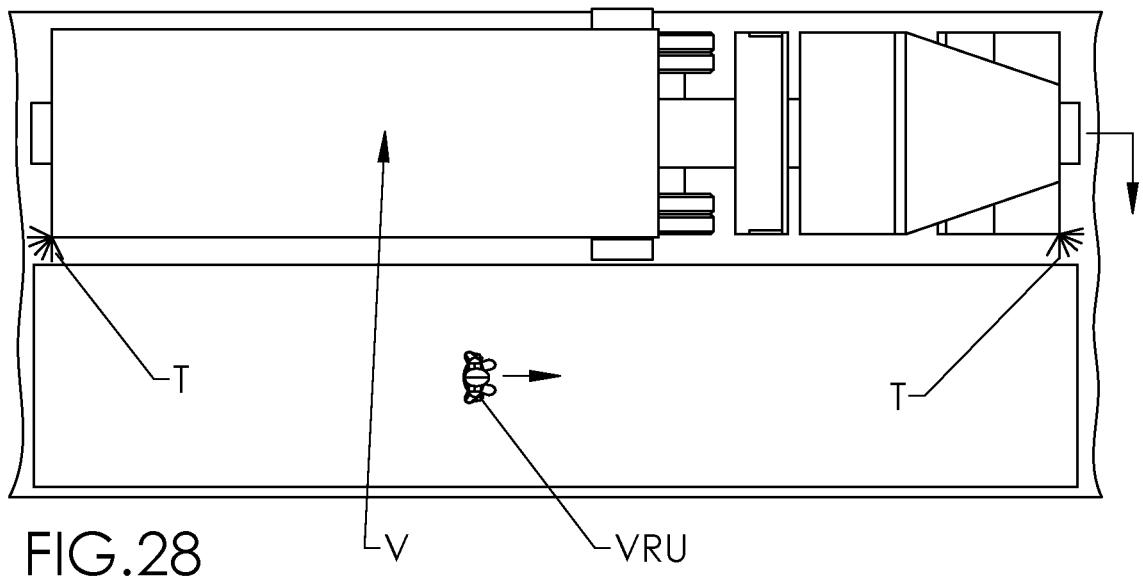
FIG. 28 is a top view of the exemplary vehicle and person (such as a vulnerable road user) of FIG. 26, wherein the vehicle has turned on a turn signal as the operator is planning to turn the vehicle.
Figure 29:
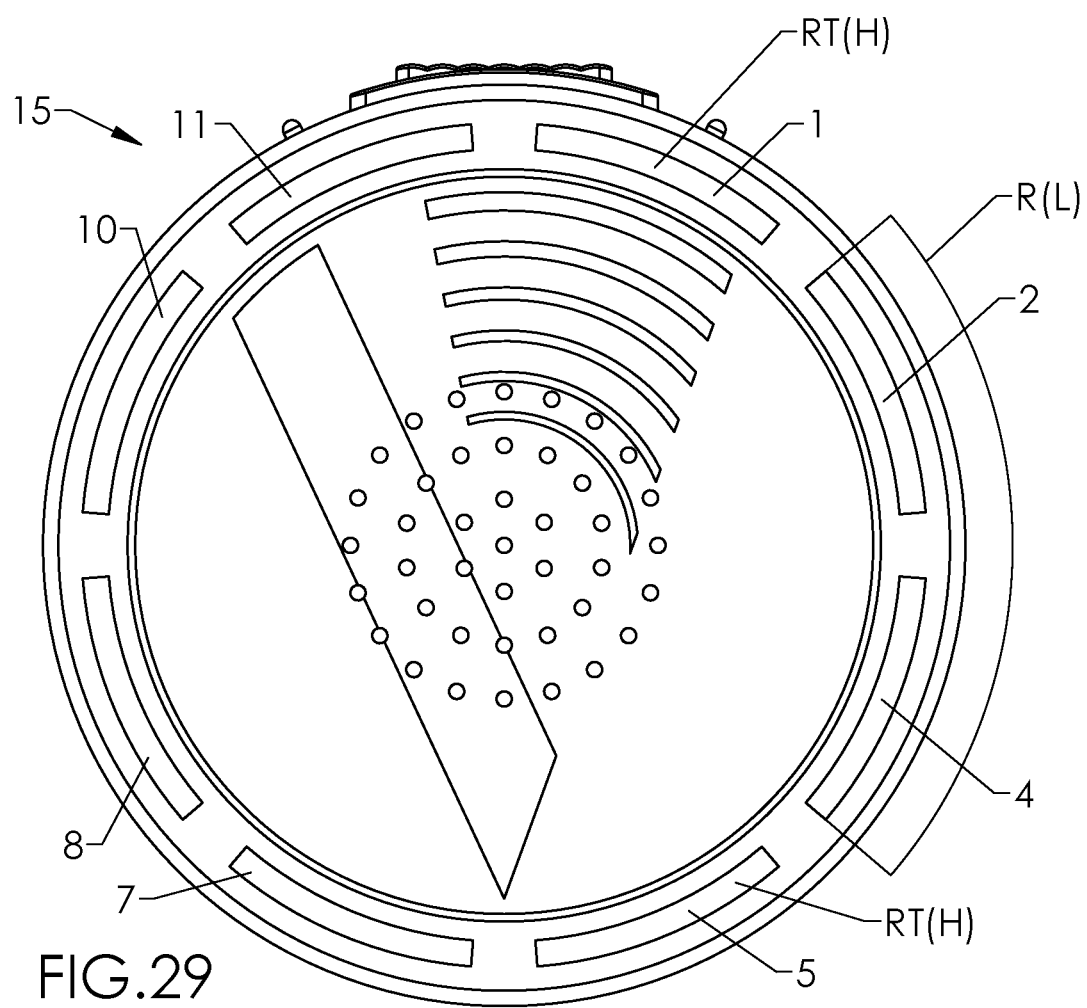
FIG. 29 illustrates the alert pattern on the display surface of the unit of FIG. 2, for the situation in FIG. 28.
Figure 30:
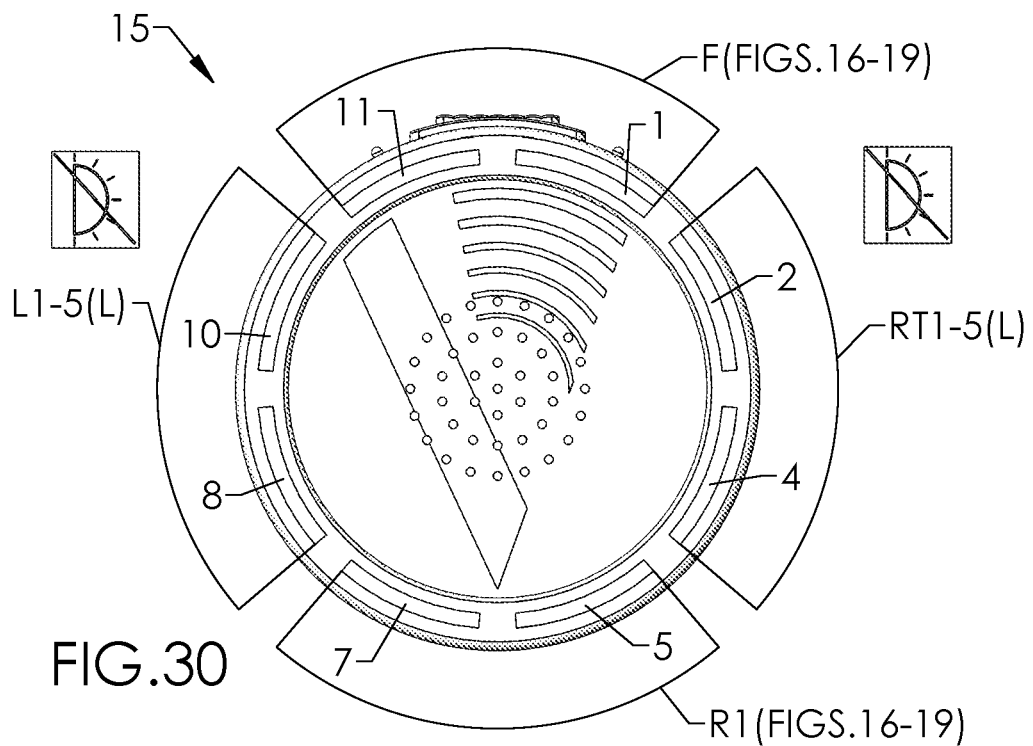
FIGS. 30 and 31 illustrate alert patterns for a four-sensor system (front, right, rear, and left sensors), for a situation such as that in FIG. 26 wherein no turn signal is on (FIG. 30) and for a situation such as that in FIG. 28 when a turn signal (right or left) comes on (FIG. 31).

FIGS. 26-29 illustrate an embodiment of object detection systems having only a right or left sensor (preferably both) and its display unit alert. In FIGS. 26 and 27, a right side sensor detects an object, in this case a person or other vulnerable road user, walking/moving parallel to the vehicle in the same direction as the vehicle travel/movement, but no turn signal has been actuated. FIGS. 28 and 29 illustrate the embodiment and display unit of FIGS. 26 and 27, wherein the display pattern is modified because a turn signal has been actuated, indicating that the operator is planning, or beginning, to turn. Preferred embodiments comprise both right and left sensors and turn-signal triggering of alerts for both right and left turns, in which case the alerts preferably include the right-side display patterns as shown in FIGS. 27 and 29 for right-side detections, and also left-side display patterns (that are the mirror image of those in FIGS. 27 and 29) for left-side detections.

Figure 31:
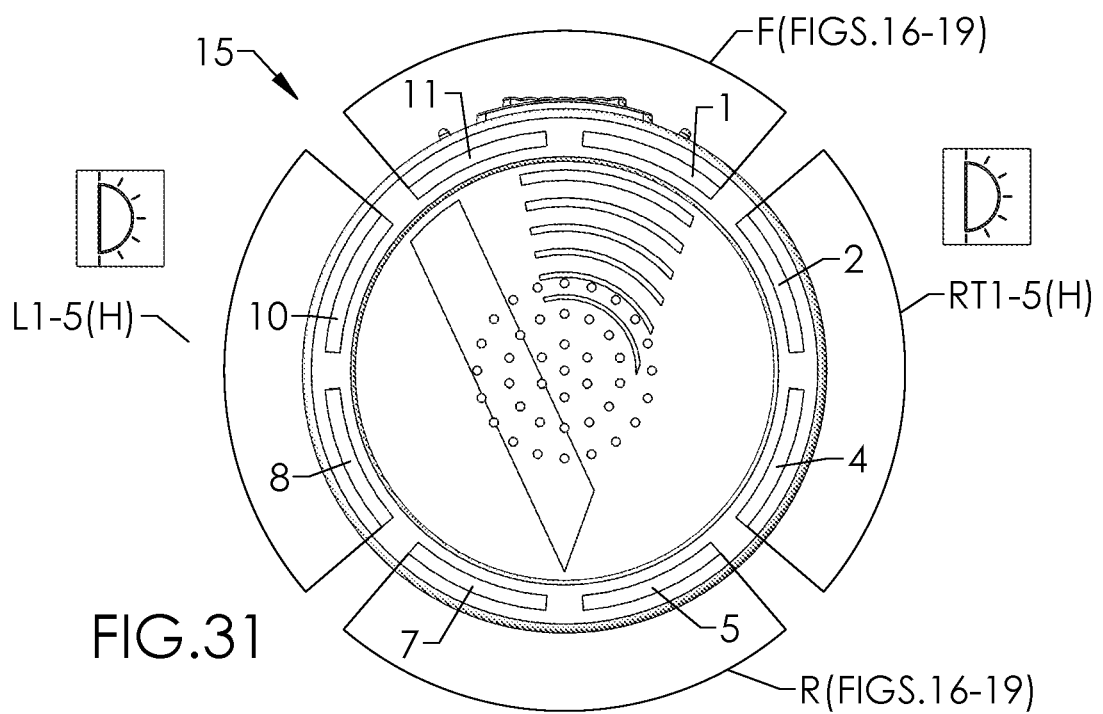

FIGS. 29 and 31 illustrate turn-signal triggered alerts, and partitioning and details of the alert patterns for a combination system comprising sensors on each of four sides of the vehicle. FIG. 29 shows the alerts when all vehicle turn signals are off, and FIG. 31 shows the alerts when a turn signal is turned on. It will be understood that the alert pattern of FIG. 30 may be emitted all around the display, given the four sensors and given no turn signal being on. It will also be understood, that when a turn signal is turned on, one of the higher alerts at the right or left (but not both) in FIG. 31 will be emitted depending on whether the right or the left turn signal is turned on, and the front and rear alert patterns may continue to be displayed and to be modified, for example as in FIGS. 16-19, as detections of the front and rear sensors change.

Figure 34:
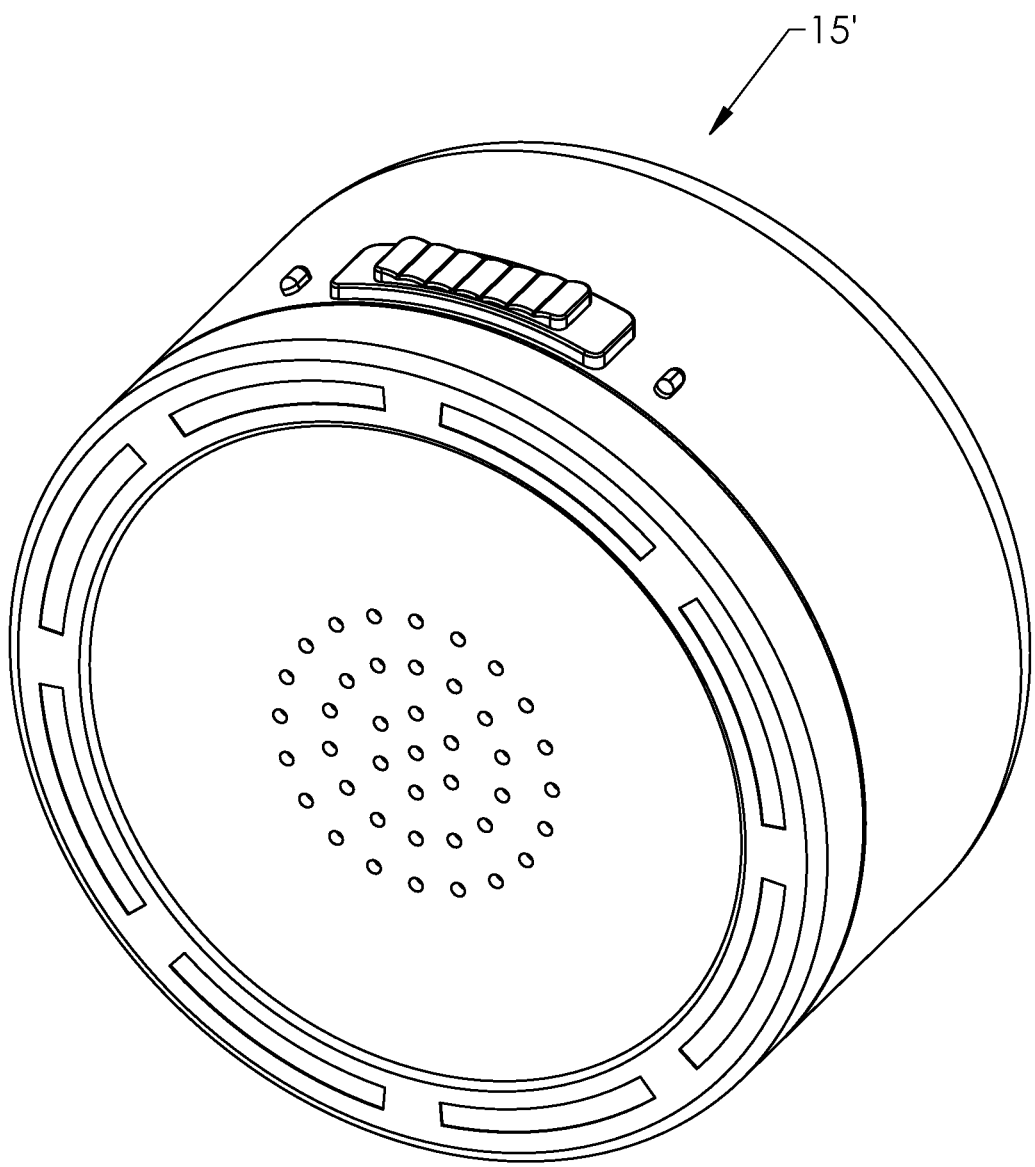
FIG. 34 is a perspective top view of the unit of FIG. 2, except without the V Logo™ being on the display surface.
Figure 35:
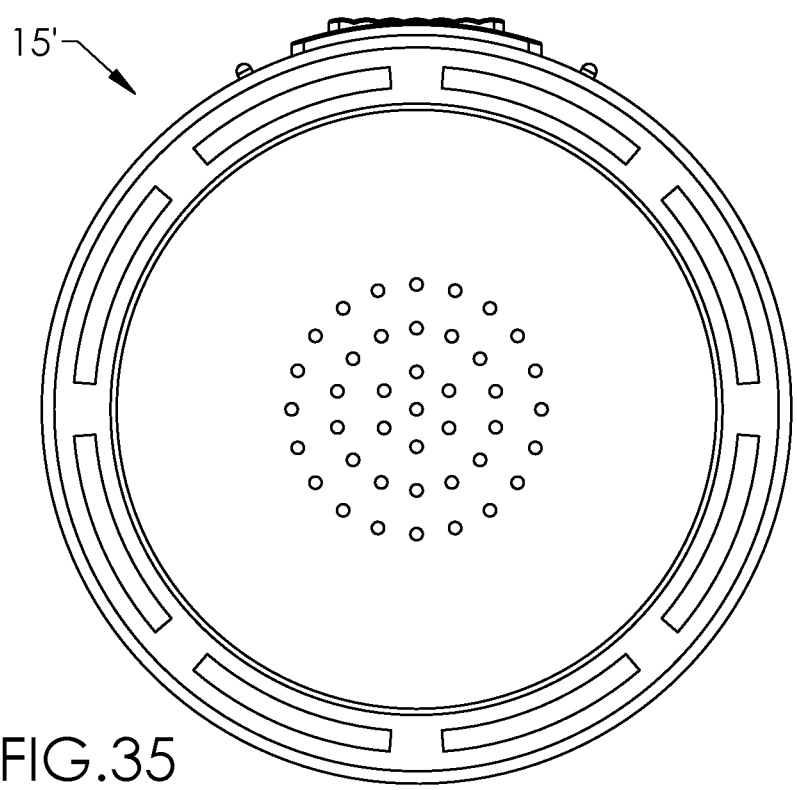
FIG. 35 is a top view of the unit of FIG. 34.
Figure 36:
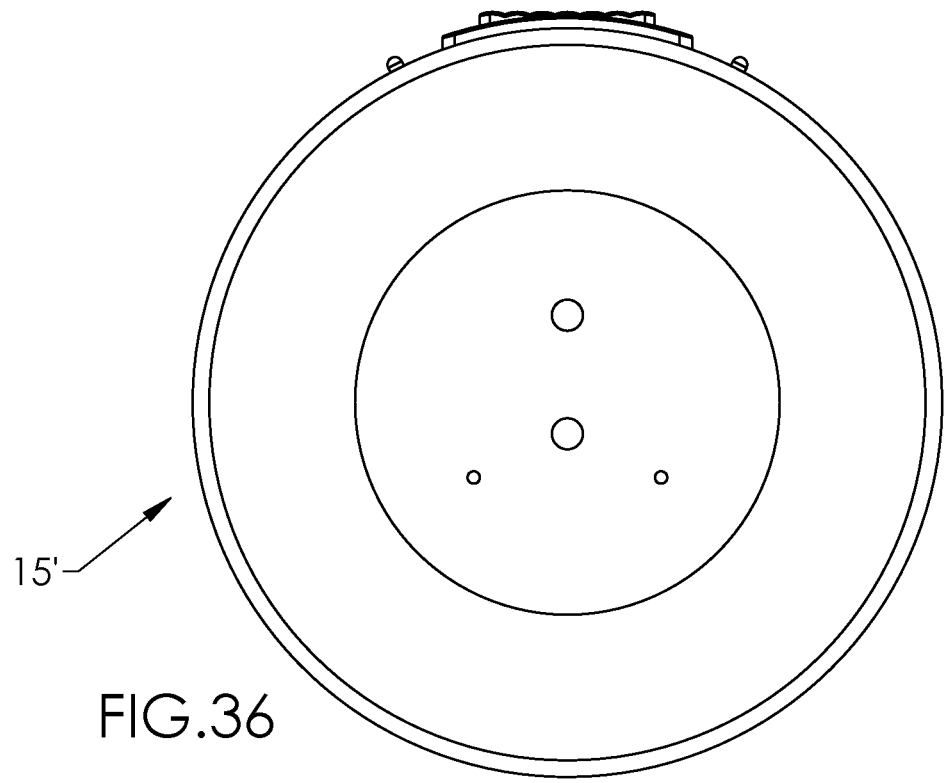
FIG. 36 is a bottom view of the unit of FIG. 34.
Figure 37:
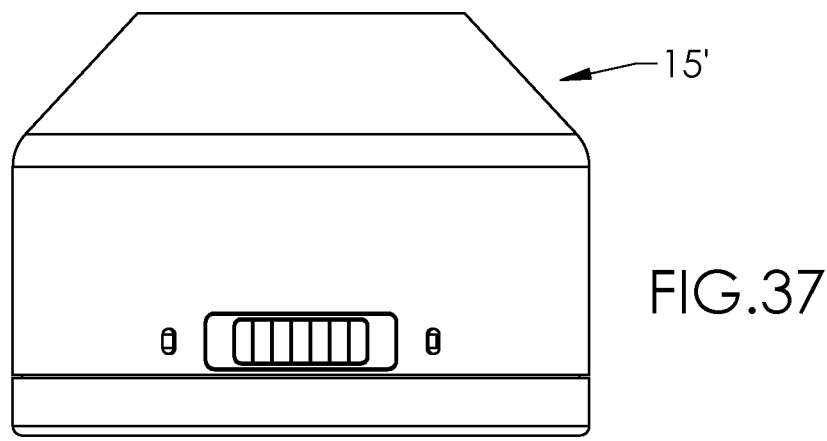
FIG. 37 is a front view of the unit of FIG. 34.
Figure 38:
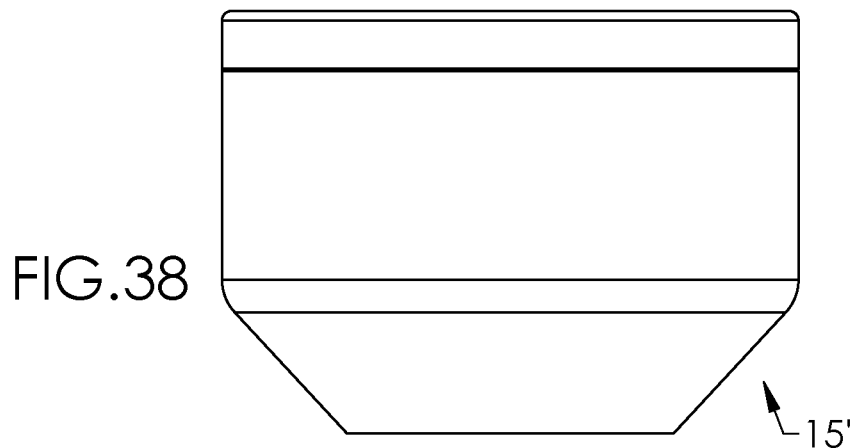
FIG. 38 is a rear view of the unit of FIG. 34.
Figure 39:
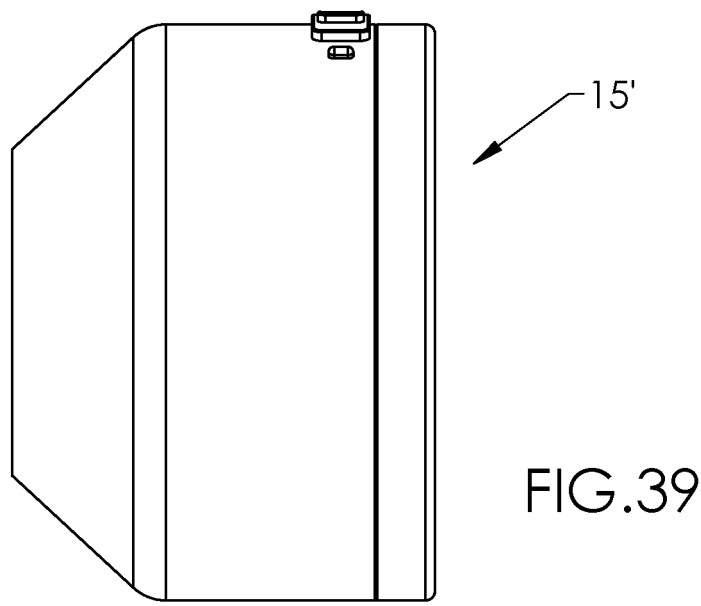
FIG. 39 is a left side view of the unit of FIG. 38, wherein the right side view is a mirror image of the left side view.

FIGS. 32 and 34 illustrate an embodiment wherein a right sensor detects an object, specifically a person or other vulnerable road user walking/moving parallel to the vehicle on the right of the vehicle, and in the opposite direction as the vehicle travel/movement because the vehicle is backing up parallel to the person. Preferably such an embodiment comprises at least right and left sensors and the vehicle-back-up display pattern of FIG. 33 when an object is detected on the right, and the mirror-image display pattern emitted on the left of the display when an object is detected on the left. Thus, certain embodiments envision that the right and/or left, or both the right and left patterns of FIG. 33 may be emitted depending on whether the vehicle is backing up beside a traveling/moving object on the right, the left, or both, respectively. In certain embodiments of an alert based on the vehicle backing up, the light alert pattern and/or sound will be modified or escalated if the detected object is closer to the vehicle than a predetermined "side-close" setting provided in the sensor/system; such a "side-close" alert may be particularly important in crowded or complicated environments such as city streets wherein a vulnerable road user (VRU) such as a bicyclist or a pedestrian may be present. Also, or instead, in certain embodiments, alert patterns when an object is detected beside a vehicle and the vehicle is backing up, as in FIG. 32, will be escalated with sounds and/or light modification compared to the alert pattern shown in FIG. 33, when a turn signal of the vehicle is turned on; such an escalated situation-specific alert is warranted due to the possible extra danger vehicle portion may swing toward the object during the backing-up of the vehicle.

In certain embodiments, status lights such as LEDs 38, 38', and/or trouble-shooting light patterns created by lights 1, 2, 4, 5, 7, 8, 10, and 11, are used to indicate that the system is on or off, and/or that there are equipment or operation problems. For example, predetermined light patterns, different from the object detection display patterns, may be emitted for situation such as: LED burnout, a missing/inoperable sensor, blockage of a sensor by dirt/debris, a problem with GPS or vehicle CAN, or other equipment problems or errors.

The display unit 15', with the V Logo™ removed, is shown in various views in FIGS. 34-39, so that all sides of the display unit 15' are seen, without the cable 32 or the mount 34 being connected. The larger circles on the bottom view in FIG. 36 may be apertures in the housing, for example, for receiving cable 32 and a cable for auxiliary output of an auxiliary alarm or other data/information. FIG. 40 shows the unit 15' as a component of an embodiment of an object detection system 400 in FIG. 40. In FIG. 40, a radar-based sensor 300, electrical and data cable/connection 303 between the sensor 300 and the display unit 15', and a power cable 304 are illustrated. While one sensor 300 is shown in FIG. 40, it will be understood that the system 400 may comprise multiple sensors operatively connected to the single display 15'. FIG. 40 also illustrates, schematically in dashed lines, the hardware, firmware and/or software 320 provided inside the sensor 300 housing 325 for effective operation of the sensor 300 and its communications to the display unit 15', for example, a CAN transceiver to communicate with the display unit, radar transceiver circuitry, and signal processing and transmission circuity. FIG. 40 also illustrates, schematically in dashed lines, the hardware, firmware and/or software 330 provided inside the display unit 15' housing 335, for example, a CAN transceiver for communicating with a vehicle, microprocessor(s) for prioritizing and partitioning the detections to arrive at the selected display pattern on the display surface/face, and to optionally send out auxiliary alarm(s) or data/information to apparatus a distance from the display unit 15'. From this disclosure and the drawings, one of skill in radar detection systems and electronics will understand how to make and manufacture said hardware, firmware and/or software 320 and 330.

In certain embodiments, the invention may be described as: 1) A method for alerting a vehicle operator of potential safety threats for an area 360 degrees around the vehicle comprising: placing the appropriate amount of sensors around the vehicle; identifying the location of the sensors (left, right, front, rear); accumulating information from all sensors; parsing the sensor information to find the closest detection from each sensor; combining the results of all four sides into a single pattern of lights; displaying the results. In certain embodiments, the invention may be described as: 2) A method for alerting a vehicle operator of potential safety threats on any side of a vehicle comprising: placing the desired sensors around the vehicle; identifying the location of the sensors (left, right, front, rear); accumulating information from all sensors; parsing the sensor information to find the closest detection; combining the results of all relevant sides into a single pattern of lights; displaying the results. Certain embodiments may be as in either of items 1 or 2 in this paragraph, wherein: a) the sensor information is accumulated with a microprocessor; b) any combination of left, right, front and rear sensors can be used; c) said single pattern of lights may be various numbers of lights, various colors of lights, and/or flashing lights. Certain embodiments of either of items 1 or 2 may be noted to not include any pointer, for no pointer that points at any light or sector of the display. Certain embodiments of either of items 1 or 2 may be noted to not include any dimming of lights, for example, the preferred lights are either full-on, off, or flashing between the two conditions. The following claims are hereby incorporated in their entirely into this Detailed Description.

Although this disclosed technology has been described above with reference to particular means, materials and embodiments, it is to be understood that the disclosed technology is not limited to these disclosed particulars, but extends instead to all equivalents within the broad scope of the following Claims. For example, in the above description the display is mechanical-electrical (e.g. display surface, plurality of lights, LEDs, etc). However, this recited structure may be, in certain embodiments, present digitally as depicted on a digital screen such as a video display, computer screen, or computer monitor, for example, with the display surface, plurality of lights, etc, being only digital images thereof, including schematic digital images. Further, where a particular feature/aspect, a particular embodiment, and/or particular step(s) of operation are disclosed herein, that feature/aspect, embodiment, and/or operation step can also be used and may be included, to the extent appropriate and effective, in other embodiments and in the invention generally.

The invention claimed is:

1. A display for a vehicle object detection radar system with a plurality of radar sensors, the display comprising:
   a housing comprising a cylindrical sidewall extending between a display surface and an opposing surface;
   a plurality of lights disposed to emit light from the display surface, the plurality of lights being disposed to emit light about a periphery of the display surface, proximate the sidewall;
   one or more data connections coupled to the housing and configured to receive sensor data from a plurality of sensors disposed about a periphery of a vehicle; and
   display controls disposed in the housing, the display controls configured to:
      receive, via the data connection, the sensor data from the plurality of sensors disposed about the periphery of the vehicle,
      identify, based on the sensor data, presence of an object proximate the vehicle and a location of the object relative to the vehicle;
      determine, based at least in part on the presence of the object and the location of the object, a subset of the plurality of lights corresponding positionally with the location of the object, and
      cause the subset of the plurality of lights to emit light from the display surface.

2. The display of claim 1 wherein the subset of the plurality of lights comprises a first subset of lights corresponding to a first sensor of the plurality of sensors and the plurality of lights further comprises a second subset of lights corresponding to a second sensor of the plurality of sensors.

3. The display of claim 2 wherein the first subset and the second subset each comprise at least two lights.

4. The display of claim 3 that also comprises an output port for an audible alarm in, on, or near the display surface.

5. The display of claim 1 wherein the display surface is an area defined by 360 degrees around a center of the display surface and that comprises two subsets of the plurality of lights, each of the subsets being located on an area defined as 180 degrees of the display surface for partitioning the display surface into a 180 degree sector for each of a front radar sensor and a rear radar sensor, or for each of a right radar sensor and a left radar sensor.

6. The display of claim 5 wherein the two 180 degree sectors of lights each emit simultaneously same or different light patterns selected from colored light, flashing light, and light flashing between multiple colors, to indicate simultaneous object detection by two radar sensors.

7. The display of claim 6 wherein objects detected by each of the radar sensors are prioritized by the display controls according to potential danger of each detected object to the vehicle, and the lights of each sector are lit simultaneously in one or more colors selected from a high-danger alert color, a low-danger alert color, and a cautionary alert color, and each color being selected from a continuous-on color, a flashing color, and flashing between two different colors.

8. The display of claim 1 wherein the display surface is an area defined by 360 degrees around a center of the display surface and that comprises four subsets of the plurality of lights, each being located on an area defined as 90 degrees of the display surface generally at 12 o'clock, 3 o'clock, 6 o'clock and 9 o'clock positions corresponding to radar sensors of the plurality of sensors on the front, right, rear and left of a vehicle, respectively.

9. The display of claim 8, wherein the four 90 degree sectors of lights each emit simultaneously same or different light patterns selected from colored light, flashing light, and light flashing between multiple colors, to indicate simultaneous object detection by four radar sensors.

10. The display of claim 9 wherein objects detected by each of the radar sensors are prioritized by the display controls according to potential danger of each detected object to the vehicle, and the lights of each sector are lit simultaneously in one or more colors selected from a high-danger alert color, a low-danger alert color, and a cautionary alert color, and each color being selected from a continuous-on color, a flashing color, and flashing between two different colors.

11. The display as in claim 1, wherein the display is adapted to indicate the direction and distance of a detected object relative to the vehicle.

12. The display of claim 11, wherein the display indicates the distance of the detected object by prioritizing the objects detected by each sensor according to multiple zones of distance from the vehicle, and the display is partitioned into multiple sectors to simultaneously emit a light pattern on the display surface for each sensor corresponding to the closest zone in which an object is detected by the respective sensor.

13. The display of claim 1, wherein the display is adapted to indicate a location on the vehicle currently most under threat of impact or collision as determined by the display controls.

14. The display as in claim 13, wherein the display controls are further configured to:
   receive information about a state of a turn signal associated with the vehicle;
   wherein the determining the subset of the plurality of lights is based at least in part on the state of the turn signal.

15. The display of claim 13, wherein the display controls are further configured to:
   receive information about a direction of travel of the vehicle;
   wherein the determining the subset of the plurality of lights is based at least in part on the direction of travel of the turn signal.

16. The display of claim 15, wherein the display is further adapted to indicate an increased threat of impact or collision as determined by the controller of the radar system when an object is moving in a zone right or left of the vehicle.

17. A radar object detection system for a vehicle, the system comprising:
   a plurality of radar sensors mounted on sides of the vehicle; and
   a display comprising:
      a housing comprising a cylindrical sidewall extending between a display surface and an opposing surface;

a plurality of lights disposed to emit light from the display surface, the plurality of lights being disposed to emit light about a periphery of the display surface, proximate the sidewall;

one or more data connections coupled to the plurality of sensors; and display controls disposed in the housing, the display controls configured to:

receive, via the data connection, the sensor data from the plurality of sensors disposed about the periphery of the vehicle, identify, based on the sensor data, presence of an object proximate the vehicle and a location of the object relative to the vehicle;

determine, based at least in part on the presence of the object and the location of the object, a subset of the plurality of lights corresponding positionally with the location of the object, and cause the subset of the plurality of lights to emit light from the display surface.

18. The system of claim 17 that is adapted to indicate the direction and distance of a detected object relative to the vehicle.

19. The system of claim 18, wherein the display indicates the distance of the detected object by the display controls prioritizing the objects detected by each sensor according to multiple zones of distance from the vehicle, and wherein the display emits a light pattern on the display surface that corresponds to a level of alert for each sensor corresponding to the closest zone in which an object is detected by the respective sensor.

20. The system of claim 17, wherein the system is adapted to indicate a location on the vehicle currently most under threat of impact or collision as determined by a controller of the radar system.

21. The system of claim 20, wherein the subset of the plurality of lights comprises a first subset of lights corresponding to a first sensor of the plurality of sensors and the plurality of lights further comprises a second subset of lights corresponding to a second sensor of the plurality of sensors.

22. The system of claim 20, wherein the first subset and the second subset each comprise at least two lights.

23. The system of claim 20, wherein the display surface also comprises an output port for an audible alarm in, on, or near the display surface.

24. The system of claim 20, wherein the display surface is an area defined by 360 degrees around a center of the display surface and that comprises two subsets of the plurality of lights, each of the subsets being located on an area defined as 180 degrees of the display surface for partitioning the display surface into a 180 degree sector for each of a front radar sensor and a rear radar sensor, or for each of a right radar sensor and a left radar sensor.

25. The system of claim 24 wherein the two 180 degree sectors of lights each emit simultaneously the same or different light patterns selected from colored light, flashing light, and light flashing between multiple colors, to indicate simultaneous object detection by two radar sensors.

26. The system of claim 20, wherein the display surface is an area defined by 360 degrees around a center of the display surface and that comprises four subsets of the plurality of lights, each being located on an area defined as 90 degrees of the display surface generally at 12 o'clock, 3 o'clock, 6 o'clock and 9 o'clock positions corresponding to radar sensors of the plurality of sensors on the front, right, rear and left of a vehicle, respectively.

27. The system of claim 26 wherein the four 90 degree sectors of lights each emit simultaneously the same or different light patterns selected from colored light, flashing light, and light flashing between multiple colors, to indicate simultaneous object detection by four radar sensors.

28. The system of claim 20, wherein the display controls are configured to prioritize objects detected by each of the radar sensors according to potential for impact or collision with each detected object to the vehicle, and the lights of each sector are lit simultaneously in one or more colors selected from a high-danger alert color, a low-danger alert color, and a cautionary alert color, and each color being selected from a continuous-on color, a flashing color, and flashing between two different colors.

29. A display for an operator of a vehicle equipped with a plurality of object detection radar sensors, the display comprising:

a housing comprising a cylindrical sidewall extending between a display surface and an opposing surface;

a plurality of lights disposed to emit light from the display surface, the plurality of lights being disposed to emit light about a periphery of the display surface, proximate the sidewall, individual of the plurality of lights being positioned at one o'clock, two o'clock, four o'clock, five o'clock, seven o'clock, eight o'clock, ten o'clock, and eleven o'clock positions when the display surface is viewed as the face of a 12-hour clock;

one or more data connections coupled to the plurality of sensors; and display controls disposed in the housing, the display controls configured to:

receive, via the data connection, the sensor data from the plurality of sensors disposed about the periphery of the vehicle, identify, based on the sensor data, presence of an object proximate the vehicle and a location of the object relative to the vehicle;

determine, based at least in part on the presence of the object and the location of the object, a subset of the plurality of lights corresponding positionally with the location of the object, and cause the subset of the plurality of lights to emit light from the display surface.

30. The display of claim 29, wherein lights at the one and eleven o'clock positions are responsive to a radar sensor located at or near the front of the vehicle.

31. The display of claim 29, wherein lights at the two and four o'clock position are responsive to a radar sensor located at or near the right side of the vehicle.

32. The display of claim 29, wherein lights at the five and seven o'clock positions are responsive to a radar sensor located at or near the rear side of the vehicle.

33. The display of claim 29, wherein lights at the eight and ten o'clock positions are responsive to a radar sensor located at or near the left side of the vehicle.

34. The display of claim 29, wherein the lights are responsive to radar sensors at the front, right, rear, and left sides of the vehicle and emit an alert pattern simultaneously around the entire outer perimeter edge of the display surface to indicate the closest object detected on all four sides of the vehicle.

* * * * *